(12) United States Patent
Asano

(10) Patent No.: US 9,604,687 B2
(45) Date of Patent: Mar. 28, 2017

(54) VEHICLE

(71) Applicant: YAMAHA HATSUDOKI KABUSHIKI KAISHA, Iwata-shi, Shizuoka (JP)

(72) Inventor: Daisuke Asano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/901,368

(22) PCT Filed: Jun. 30, 2014

(86) PCT No.: PCT/JP2014/067475
§ 371 (c)(1),
(2) Date: Dec. 28, 2015

(87) PCT Pub. No.: WO2015/002162
PCT Pub. Date: Jan. 8, 2015

(65) Prior Publication Data
US 2016/0121958 A1     May 5, 2016

(30) Foreign Application Priority Data

Jul. 1, 2013   (JP) ................................. 2013-138476

(51) Int. Cl.
*B62K 5/10*     (2013.01)
*B60G 13/06*     (2006.01)
(Continued)

(52) U.S. Cl.
CPC ............... *B62K 5/10* (2013.01); *B60G 13/06* (2013.01); *B60G 21/005* (2013.01);
(Continued)

(58) Field of Classification Search
CPC .. B62K 25/08; B62K 5/027; B62K 2005/001; B62K 5/10; B62J 2099/002; B60G 2204/112
See application file for complete search history.

(56) References Cited

U.S. PATENT DOCUMENTS 2,953,395 A * 9/1960 Turner .................... B60G 15/06
                                                                                267/221
5,611,555 A * 3/1997 Vidal ....................... B60G 3/14
                                                                                180/215
(Continued)

FOREIGN PATENT DOCUMENTS

EP        1 516 806 A1     3/2005
JP        2008-155671 A     7/2008
(Continued)

OTHER PUBLICATIONS

Official Communication issued in corresponding International Application PCT/JP2014/067475, mailed on Sep. 9, 2014.

*Primary Examiner* — Paul N Dickson
*Assistant Examiner* — Timothy Wilhelm
(74) *Attorney, Agent, or Firm* — Keating and Bennett, LLP

(57) ABSTRACT

At least a portion of a detecting portion of a front wheel rotation speed detector is supported on one front telescopic element of a shock absorbing device and is positioned in, as viewed in the direction of a wheel axis, an area defined by a front imaginary line which passes a front end of the shock absorbing device and which is parallel to a steering axis and a rear imaginary line which passes a rear end of the shock absorbing device and which is parallel to the steering axis in a perpendicular or substantially perpendicular direction to the wheel axis and the steering axis, an area located inwards (Continued)

of an outer shape of a wheel, and an area which is located outside an area defined between the front and rear telescopic elements.

5 Claims, 12 Drawing Sheets

(51) Int. Cl.
| | | |
|---|---|---|
| B60G 21/05 | (2006.01) | |
| B62K 5/027 | (2013.01) | |
| B62K 5/05 | (2013.01) | |
| B60G 21/00 | (2006.01) | |
| B60G 21/02 | (2006.01) | |
| B60G 21/04 | (2006.01) | |
| B62K 5/08 | (2006.01) | |
| B62K 25/08 | (2006.01) | |
| B62J 99/00 | (2009.01) | |
| B62K 5/00 | (2013.01) | |

(52) U.S. Cl.
CPC ........... *B60G 21/026* (2013.01); *B60G 21/04* (2013.01); *B60G 21/05* (2013.01); *B62J 99/00* (2013.01); *B62K 5/027* (2013.01); *B62K 5/05* (2013.01); *B62K 5/08* (2013.01); *B62K 25/08* (2013.01); *B60G 2204/10* (2013.01); *B60G 2204/112* (2013.01); *B60G 2300/122* (2013.01); *B60G 2300/45* (2013.01); *B62J 2099/002* (2013.01); *B62K 2005/001* (2013.01)

(56) References Cited

U.S. PATENT DOCUMENTS

| | | | | |
|---|---|---|---|---|
| 6,492,805 | B1* | 12/2002 | Wakabayashi | B60T 1/065 324/160 |
| 7,568,541 | B2* | 8/2009 | Pfeil | B60G 21/007 180/210 |
| 7,661,771 | B2* | 2/2010 | Nimura | B60T 8/1706 180/219 |
| 7,901,013 | B2* | 3/2011 | Ishida | B60T 8/171 303/137 |
| 9,227,662 | B2* | 1/2016 | Bartolozzi | B60G 3/01 |
| 2006/0151232 | A1* | 7/2006 | Marcacci | B60G 21/007 180/414 |
| 2008/0238005 | A1* | 10/2008 | James | B62D 9/02 280/5.509 |
| 2009/0183957 | A1* | 7/2009 | Ishida | B60T 8/329 188/181 R |
| 2013/0168944 | A1* | 7/2013 | Bartolozzi | B60G 3/01 280/269 |
| 2013/0193656 | A1 | 8/2013 | Itoh et al. | |
| 2016/0144923 | A1* | 5/2016 | Asano | B62K 5/05 280/124.103 |

FOREIGN PATENT DOCUMENTS

| | | |
|---|---|---|
| JP | 2012-25370 A | 2/2012 |
| WO | 2012/007819 A1 | 1/2012 |
| WO | 2012/049724 A1 | 4/2012 |

\* cited by examiner

VEHICLE

BACKGROUND OF THE INVENTION

1. Field of the Invention

The present invention relates to a vehicle including a body frame that leans and two front wheels which are aligned in a left-and-right direction.

2. Description of the Related Art

International Patent Publication No. 2012/007819 describes a vehicle including a body frame that leans and two front wheels which are aligned in a left-and-right direction.

In general, the vehicle including the body frame that leans and the two front wheels which are aligned in a left-and-right direction is a vehicle which turns with the body frame leaning from a vertical direction. More specifically, the body frame leans to the right of the vehicle when the vehicle turns right, whereas when the vehicle turns left, the body frame leans to the left of the vehicle. In the vehicle described above which includes the body frame that leans and the two front wheels which are aligned in a left-and-right direction, since the body frame is caused to lean, a distance defined between the two front wheels which are aligned in a left-and-right direction of the body frame is very short compared with a normal four-wheeled vehicle. The vehicle including the body frame that leans and the two front wheels which are aligned in a left-and-right direction is a vehicle which is compact and highly maneuverable.

The vehicle described in International Patent Publication No. 2012/007819 which includes the body frame that leans and the two front wheels which are aligned in a left-and-right direction includes a right shock absorbing device and a left shock absorbing device which each include two telescopic elements. The right shock absorbing device supports the right front wheel rotatably. The left shock absorbing device supports the left front wheel rotatably. When the handlebar is operated, the right shock absorbing device turns together with the right front wheel about a turning axis which extends in an up-and-down direction, and the left shock absorbing device turns together with the left front wheel about a turning axis which extends in an up-and-down direction. Because of this, it is designed that the right shock absorbing device, the right front wheel, the left shock absorbing device, and the left front wheel do not interfere with the body cover and other body parts.

Incidentally, in the vehicle described in International Patent Publication No. 2012/007819 which includes the body frame that leans and the two front wheels which are aligned in a left-and-right direction, it is desired to mount a front wheel rotation speed detector. The front wheel rotation speed detector includes, in addition to a sensor main body, a bracket to which the sensor main body is attached and a fastening member to fix the bracket to the vehicle. In order to mount the front wheel rotation speed detector on the vehicle, a bracket where the front wheel rotation speed detector is attached is also provided on the vehicle side. Because of this, in attempting to mount the front wheel rotation speed detector, it is necessary to ensure a space where those members are disposed and a space which prevents those members from interfering with other members. This causes a concern that the vehicle including the body frame that leans and the two front wheels which are aligned in a left-and-right direction is enlarged in size.

Then, as shown in FIG. 12, International Patent Publication No. 2012/007819 discloses that a front wheel rotation speed detector 1028 is provided between two telescopic elements 1022, 1024. A gap is inevitably generated between the two telescopic elements 1022, 1024 which are aligned in a back-and-forth direction. Additionally, the gap is originally a dead space. In International Patent Publication No. 2012/007819, however, the space is effectively used by providing a front wheel rotation speed detector 1028 in the gap which is a dead space.

In this manner, in International Patent Publication No. 2012/007819, although the front wheel rotation speed detector is mounted on the vehicle including the body frame that leans and the two front wheels which are aligned in a left-and-right direction, the enlargement in size of the vehicle is reduced by the use of this space.

However, the market still demands a more compact vehicle which includes a body frame that leans and two front wheels which are aligned in a left-and-right direction. It is desirable for this reason that the enlargement in the size of the vehicle including the body frame that leans and the two front wheels which are aligned in a left-and-right direction is reduced further although the front wheel rotation speed detector is mounted on the vehicle.

SUMMARY OF THE INVENTION

Preferred embodiments of the present invention provide a vehicle including a body frame that leans and two front wheels which are aligned in a left-and-right direction which significantly reduces or prevents the enlargement of the vehicle even though the front wheel rotation speed detector is mounted thereon.

According to a preferred embodiment of the present invention, a vehicle includes a body frame that leans to the right of the vehicle when the vehicle turns right and leans to the left of the vehicle when the vehicle turns left; a right front wheel and a left front wheel which are aligned in a left-and-right direction of the body frame and which each include a tire and a wheel which supports the tire; a suspension device which includes a right shock absorbing device and a left shock absorbing device which support the right front wheel and the left front wheel so as to rotate about wheel axes thereof, respectively, and which each include a front telescopic element and a rear telescopic element which are aligned in a front-and-rear direction of the body frame and a connecting portion which connects the front telescopic element and the rear telescopic element together and which supports the right shock absorbing device and the left shock absorbing device on the body frame so that the right shock absorbing device and the left shock absorbing device turn individually about steering axes thereof which extend in a direction perpendicular or substantially perpendicular to the wheel axes and is able to be displaced in an up-and-down direction of the body frame; and a front wheel rotation speed detector which includes a detected portion which rotates together with one front wheel of the right front wheel and the left front wheel and a detecting portion which is provided on one shock absorbing device of the right shock absorbing device and the left shock absorbing device which supports the one front wheel to measure a rotation speed of at least the one front wheel of the right front wheel and the left front wheel, wherein at least a portion of the detecting portion of the front wheel rotation speed detector is supported on the front telescopic element or the rear telescopic element of the one shock absorbing device and is positioned, as viewed in the direction of the wheel axis, in an area which is defined by a front imaginary line which passes a front end of the one shock absorbing device and which is parallel to the steering axis and a rear imaginary line which passes a rear end of the one shock absorbing device and which is parallel to the steering axis in a perpendicular or substantially perpendicular direction to the wheel axis and the steering axis, an area which is located inwards of an external shape of the wheel, and an area which is located outside an area defined between the front telescopic element and the rear telescopic element of the one shock absorbing device.

The inventors have studied extensively the circumferential construction of the shock absorbing device for the sake of locating a front wheel rotation speed detector. It has been discovered from the results of the study that in the event that a front wheel rotation speed detector is disposed in the dead space between the two telescopic elements as described in International Patent Publication No. 2012/007819, the interval between the two telescopic elements needs to be expanded slightly. The front wheel rotation speed detector includes, in addition to a sensor main body, a bracket to which the sensor main body is attached and a fastening member to fix the bracket to the vehicle. In order to mount this front wheel rotation speed detector on the vehicle, a bracket where the front wheel rotation speed detector is attached is also provided on the vehicle side. Because of this, when attempting to mount the front wheel rotation detector between the two telescopic elements, the interval between the two telescopic elements needs to be expanded slightly compared to when no front wheel rotation speed detector is mounted therebetween. At a glance, a slight expansion of the interval between the two telescopic elements only enlarges the shock absorbing device itself slightly, and it is considered that the enlargement of the shock absorbing device minimally affects the overall size of the vehicle.

However, the inventors discovered the following problems during their extensive study. A problem was discovered that the expansion of the interval between the two telescopic elements results in a great increase in the moving range of the two telescopic elements, so that the vehicle tends to be enlarged in size to avoid the interference of the two telescopic elements with other parts on the vehicle. This is attributed to the fact that the two telescopic elements are members which are long in the direction in which they extend and contract and that the two telescopic elements turn about the steering axes along the direction in which they extend and contract when they are fixed to each other. The moving range of the two telescopic elements refers to a space where the two telescopic elements move when the two telescopic elements turn as the handlebar turns.

More specifically, when seen from the direction of the steering axis, the moving space is determined by a space which connects an arc-shaped locus which is drawn by an outer edge of the two telescopic elements and the steering axis. Therefore, in the event that the interval between the two telescopic elements is expanded to increase the external shape defined by the two telescopic elements, the moving space as seen from the direction of the steering axis increases in proportion to the square of the radius thereof which is increased as a result of the expansion of the interval. Moreover, since the two telescopic elements are long in the direction of the steering axis, the moving space as expressed in terms of volume becomes very large. Because of this, it has been discovered that in the event that the front wheel rotation speed detector is disposed between the two telescopic elements as done in International Patent Publication No. 2012/007819, the moving space tends to become large, causing an enlargement in the size of the vehicle.

Then, the inventors eventually considered a configuration different from that disclosed in International Patent Publication No. 2012/007819, wherein the front wheel rotation speed detector is disposed not in the dead space defined between the two telescopic elements but outside the dead space between the two telescopic elements.

However, in the event that the front wheel rotation speed detector is simply disposed outside the dead space between the two telescopic elements, there is the concern that the moving space in terms of volume becomes large. In general, the front wheel rotation speed detector is an element which is, compared with the two telescopic elements, small in a direction which is perpendicular or substantially perpendicular to the wheel axis of the front wheel and the steering axis (a direction which is perpendicular or substantially perpendicular to the wheel axis of the front wheel and is perpendicular or substantially perpendicular to the steering axis) and in the direction of the steering axis. Then, the inventors discovered that the moving space of the front wheel rotation speed detector and the two telescopic elements is able to be made small by devising the size of the moving space as seen from the direction of the steering axis and the position where the front wheel rotation speed detector is provided in relation to the direction of the steering axis by using the relationship in size between the front wheel rotation speed detector and the two telescopic elements.

Thus, the inventors conceived of a vehicle including the front wheel rotation speed detector which measures the rotation speed of at least one front wheel of the right front wheel and the left front wheel and which includes the detected portion which rotates together with the one front wheel and the detecting portion which is provided on one shock absorbing device of the right shock absorbing device and the left shock absorbing device which supports the one front wheel, wherein at least a portion of the detecting portion of the front wheel rotation speed detector is provided on the front telescopic element or the rear telescopic element of the one shock absorbing device in, as viewed in the direction of the wheel axis, (a) the area which is defined by the front imaginary line which passes the front end of the one shock absorbing device and which is parallel to the steering axis and the rear imaginary line which passes the rear end of the one shock absorbing device and which is parallel to the steering axis in the perpendicular or substantially perpendicular direction to the wheel axis and the steering axis, (b) the area which is located inwards of the external shape of the wheel, and (c) the area which is located outside the area defined between the front telescopic element and the rear telescopic element of the one shock absorbing device and is supported on the front telescopic element or the rear telescopic element.

According to a preferred embodiment of the vehicle, (c) at least a portion of the detecting portion of the front wheel rotation speed detector is provided in the area which is located outside the area between the front telescopic element and the rear telescopic element of the one shock absorbing device. Since the interval between the front telescopic element and the rear telescopic element is kept narrow, as viewed in the direction of the steering axis, the moving space of the front telescopic element and the rear telescopic element when the shock absorbing device turns about the steering axis is prevented from being enlarged.

Additionally, (a) at least a portion of the detecting portion of the front wheel rotation speed detector is provided in the area which is defined by the front imaginary line which passes the front end of the one shock absorbing device and which is parallel to the steering axis and the rear imaginary line which passes the rear end of the one shock absorbing device and which is parallel to the steering axis in the perpendicular or substantially perpendicular direction to the wheel axis and the steering axis, as viewed from the direction of the wheel axis. According to this configuration, as viewed from the direction of the steering axis, at least a portion of the detecting portion of the front wheel rotation speed detector is provided in the position which overlaps the moving space of the front telescopic element and the rear telescopic element. Namely, as viewed from the direction of the steering axis, when the shock absorbing device which includes the detecting portion and the front telescopic element and the rear telescopic element turns about the steering axis, at least a portion of the moving space of the detecting portion overlaps the moving space of the front telescopic element and the rear telescopic element. Because of this, although the detecting portion is mounted on the vehicle, the moving spaces of the front wheel rotation speed detector and the front telescopic element and the rear telescopic element are prevented from being enlarged as viewed from the direction of the steering axis.

Further, in the areas, (b) at least a portion of the detecting portion of the front wheel rotation speed detector is provided in the area which is located inwards of the external shape of the wheel as viewed from the direction of the wheel axis. Namely, the detecting portion of the front wheel rotation speed detector is positioned, as viewed in the direction of the wheel axis, within the specific area of which the upper limit and the lower limit are determined in the direction of the steering axis. Because of this, when the volume of the three-dimensional moving space is considered, the moving spaces of the detecting portion and the front telescopic element and the rear telescopic element are prevented from being enlarged.

For this reason, although the front wheel rotation speed detector is provided, the moving space of the shock absorbing device including the front telescopic element and the rear telescopic element is prevented from being enlarged, which prevents a further enlargement in the size of the vehicle including the body frame that leans and the two front wheels which are aligned in a left-and-right direction.

In the vehicle according to a preferred embodiment of the present invention, the following configurations are preferably used.

The steering axis is configured so that an upper portion thereof is positioned farther rearwards than a lower portion thereof in the front-and-rear direction of the body frame when the vehicle is in the upright state, and at least a portion of the detecting portion of the front wheel rotation speed detector is provided in an area which is located behind the front end of the one shock absorbing device and an area which is located outside of an area defined between the front telescopic element and the rear telescopic element of the one shock absorbing device when the vehicle is in the upright state.

In the case of the steering axis being inclined so that the upper portion of the steering axis is positioned farther rearwards than the lower portion thereof, the moving space of the front telescopic element and the rear telescopic element which results when the shock absorbing device turns about the steering axis tends to be shaped so that the front end of the lower portion projects forward of the upper portion.

According to a preferred embodiment of the vehicle, at least a portion of the detecting portion is provided in the area which is located behind the front end of the one shock absorbing device and the area which is located outside the area between the front telescopic element and the rear telescopic element of the one shock absorbing device. Namely, since at least the portion of the detecting portion is disposed in the area located behind the front end of the one shock absorbing device as viewed in the direction of the wheel axis, it is unlikely that the front portion of the lower portion of the moving space of the detecting portion and the front telescopic element and the rear telescopic element is enlarged. This prevents the moving space of the shock absorbing device including the front telescopic element and the rear telescopic element from being enlarged although the front wheel rotation speed detector is mounted thereon.

Further, since at least the portion of the detecting portion is positioned behind the front end of the shock absorbing device, the detecting portion is protected against objects (for example, a curb) which approach the detecting portion from the front by the shock absorbing device.

In the vehicle according to a preferred embodiment of the present invention, the following configurations are preferably used.

The steering axis is configured so that an upper portion thereof is positioned farther rearwards than a lower portion thereof in the front-and-rear direction of the body frame when the vehicle is in the upright state, and at least a portion of the detecting portion of the front wheel rotation speed detector is provided in an area which is located behind a front end of the one shock absorbing device, an area which is located ahead of a lower end of the one shock absorbing device, and an area which is located outside an area defined between the front telescopic element and the rear telescopic element of the one shock absorbing device when the vehicle is in the upright state.

In the case of the steering axis being inclined so that the upper portion of the steering axis is positioned farther rearwards than the lower portion thereof, the moving space of the front telescopic element and the rear telescopic element which results when the shock absorbing device turns about the steering axis tends to be shaped so that the front end of the lower portion projects forward of the upper portion and a rear end of the upper portion projects rearward of the lower portion.

According to a vehicle of a preferred embodiment of the present invention, at least the portion of the detecting portion is provided in the area which is located behind the front end of the one shock absorbing device, the area which is located ahead of the lower end of the one shock absorbing device, and the area which is located outside the area defined between the front telescopic element and the rear telescopic element of the one shock absorbing device when the vehicle is in the upright state.

Namely, since at least the portion of the detecting portion is disposed in the area located behind the front end of the shock absorbing device as viewed in the direction of the wheel axis, it is unlikely that the front portion of the lower portion of the moving space of the detecting portion and the front telescopic element and the rear telescopic element is enlarged.

Further, since at least the portion of the detecting portion is disposed in the area located ahead of the lower end of the shock absorbing device as viewed in the direction of the wheel axis, it is unlikely that the rear portion of the upper portion of the moving space of the detecting portion and the front telescopic element and the rear telescopic element is enlarged.

This prevents the moving space of the shock absorbing device including the front telescopic element and the rear telescopic element from being enlarged although the front wheel rotation speed detector is mounted thereon.

Further, since at least the portion of the detecting portion is positioned behind the front end of the shock absorbing device, the detecting portion is protected from objects which approach the detecting portion from the front thereof by the shock absorbing device. In addition, since at least the portion of the detecting portion is positioned forward of the lower end of the shock absorbing device, the detecting portion is protected against objects which approach the detecting portion from the rear thereof by the shock absorbing device.

In the vehicles according to preferred embodiments of the present invention, the following configurations are preferably used.

The steering axis is configured so that an upper portion thereof is positioned farther rearwards than a lower portion thereof in the front-and-rear direction of the body frame when the vehicle is in the upright state, and at least a portion of the detecting portion of the front wheel rotation speed detector is provided in an area which is located above a lower end of the one shock absorbing device in relation to an up-and-down direction of the body frame and an area which is located outside an area defined between the front telescopic element and the rear telescopic element of the one shock absorbing device when the vehicle is in the upright state.

In the case of the steering axis being inclined so that the upper portion of the steering axis is positioned farther rearwards than the lower portion thereof, the moving space of the front telescopic element and the rear telescopic element which results when the shock absorbing device turns about the steering axis tends to be shaped so that the front end of the lower portion projects forward of the upper portion.

According to a vehicle of a preferred embodiment of the present invention, at least the portion of the detecting portion is provided in the area which is located behind the front end of the one shock absorbing device, the area which is located above the lower end of the one shock absorbing device in relation to the up-and-down direction of the body frame, and the area which is located outside the area defined between the front telescopic element and the rear telescopic element when the vehicle is in the upright state.

Namely, since at least the portion of the detecting portion is disposed in the area which is located above the lower end of the one shock absorbing device in relation to the up-and-down direction of the body frame as viewed in the direction of the wheel axis, it is unlikely that the moving space of the detecting portion and the front telescopic element and the rear telescopic element is enlarged in relation to the direction of the steering axis.

Further, since at least the portion of the detecting portion is positioned above the lower end of the one shock absorbing device in relation to the up-and-down direction of the body frame, the detecting portion is protected against objects which approach the detecting portion from therebelow by the shock absorbing device.

In the vehicles according to preferred embodiments of the present invention, the following configurations are preferably used.

The steering axis is configured so that an upper portion thereof is positioned farther rearwards than a lower portion thereof in the front-and-rear direction of the body frame when the vehicle is in the upright state, and at least a portion of the detecting portion of the front wheel rotation speed detector is provided in an area which is located above a lower end of the rear telescopic element of the one shock absorbing device in relation to an up-and-down direction of the body frame, an area which is located below a front end of the front telescopic element of the one shock absorbing device in relation to the up-and-down direction of the body frame, and an area which is located outside an area defined between the front telescopic element and the rear telescopic element of the one shock absorbing device when the vehicle is in the upright state.

In the case of the steering axis being inclined so that the upper portion of the steering axis is positioned farther rearwards than the lower portion thereof, the moving space of the front telescopic element and the rear telescopic element which results when the shock absorbing device turns about the steering axis tends to be shaped so that the front end of the lower portion thereof projects forward of the upper portion thereof and a rear end of the upper portion thereof projects rearward of the lower portion thereof.

According to the vehicle of a preferred embodiment of the present invention, at least the portion of the detecting portion is provided in the area which is located above the lower end of the rear telescopic element of the one shock absorbing device in relation to the up-and-down direction of the body frame, the area which is located below the front end of the front telescopic element of the one shock absorbing device in relation to the up-and-down direction of the body frame, and the area which is located outside the area defined between the front telescopic element and the rear telescopic element of the one shock absorbing device when the vehicle is in the upright state.

Namely, since at least the portion of the detecting portion is disposed in the area which is located above the lower end of the one shock absorbing device in relation to the up-and-down direction of the body frame as viewed in the direction of the wheel axis, it is unlikely that the moving space of the detecting portion and the front telescopic element and the rear telescopic element is enlarged in relation to the direction of the steering axis.

In addition, as viewed from the direction of the wheel axis, since at least the portion of the detecting portion is disposed in the area which is located above the lower end of the one shock absorbing device in relation to the up-and-down direction of the body frame and the area which is located below the front end of the one shock absorbing device, it is unlikely that the moving space of the detecting portion and the front telescopic element and the rear telescopic element is enlarged in relation to the direction of the steering axis.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of a vehicle according to the present invention will be described by reference to the accompanying drawings.

In the preferred embodiments, the vehicle will be described as being a vehicle including two front wheels and one rear wheel, for example.

Figure 1:
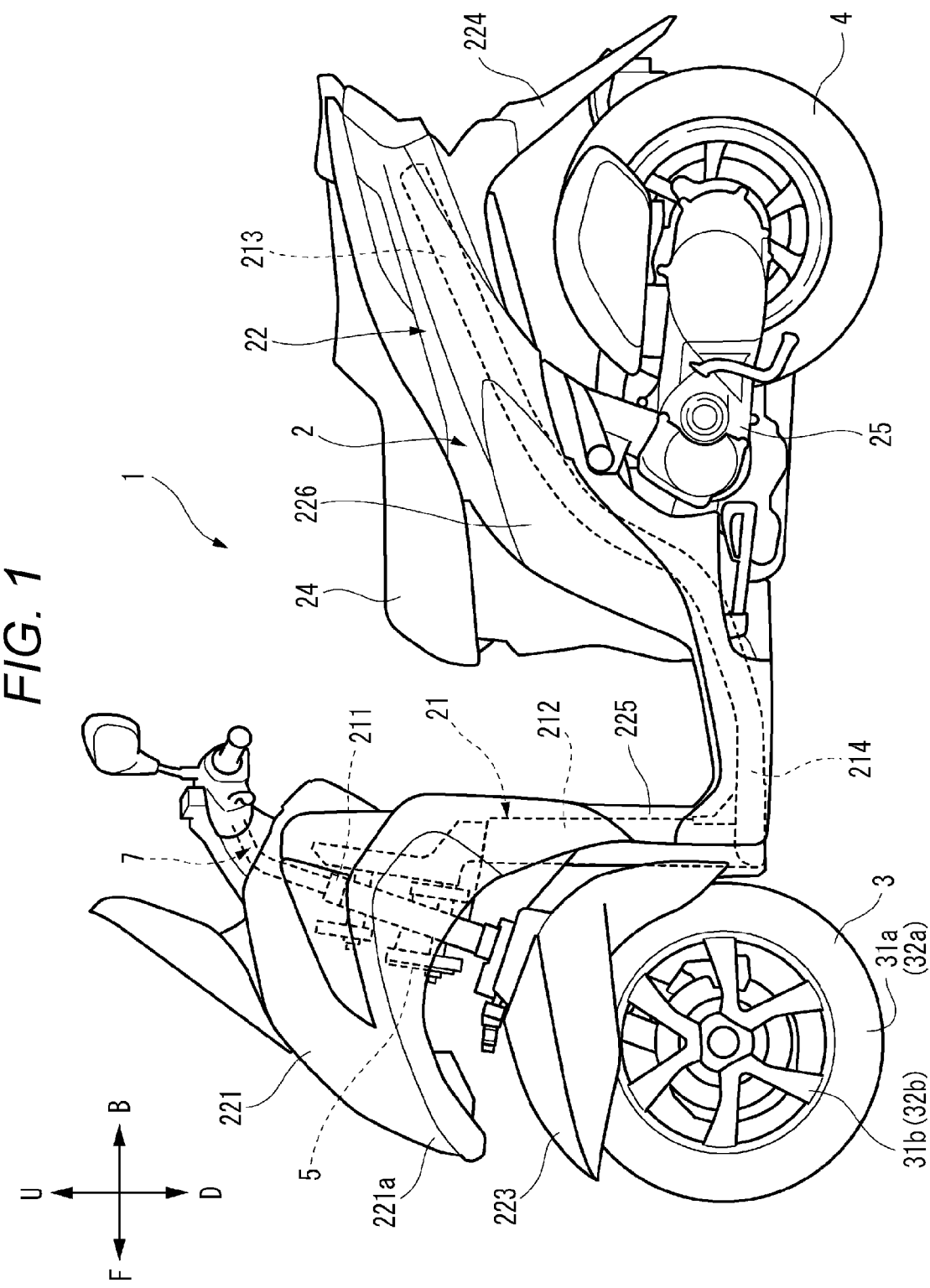
FIG. 1 is an overall side view of a vehicle according to a preferred embodiment of the present invention.

FIG. 1 is a side view of the whole of a vehicle 1 as viewed from the left thereof. Hereinafter, in the drawings, an arrow F denotes a forward direction of the vehicle 1, and an arrow B denotes a rearward direction of the vehicle 1. An arrow U denotes an upward direction of the vehicle 1 and an arrow D denotes a downward direction of the vehicle 1. When forward, rearward, leftward, and rightward directions are referred to in the following description, they mean forward, rearward, leftward and rightward directions as seen from a rider of the vehicle 1. A center in a vehicle's width direction means a central position of the vehicle 1 in the vehicle's width direction. A left-and-right direction means a horizontal direction and also a substantially left-and-right direction which inclines from the horizontal direction. The right in the vehicle's width direction means a direction directed from the center in the vehicle's width direction towards the right. The left in the vehicle's width direction means a direction directed from the center in the vehicle's width direction towards the left. An up-and-down direction means a vertical direction and also a substantially up-and-down direction which inclines from the vertical direction. An unloaded state of the vehicle means a state in which the vehicle 1 is in the upright state with front wheels neither steered nor caused to lean when no rider rides on and no fuel is put in the vehicle 1.

As shown in FIG. 1, the vehicle 1 includes a vehicle main body portion 2, a pair of left and right front wheels 3 (refer to FIG. 2), a rear wheel 4, a steering mechanism 7, and a link mechanism 5. The vehicle main body portion 2 includes a body frame 21, a body cover 22, a seat 24, and a power unit 25.

The body frame 21 includes a headstock 211, a down frame 212, an under frame 214, and a rear frame 213. In FIG. 1, in the body frame 21, portions that are hidden by the body cover 22 are shown by broken lines. The body frame 21 supports the power unit 25, the seat 24 and the like. The power unit 25 includes a drive source such as an engine, an electric motor or the like, a transmission and the like.

The headstock 211 is disposed at a front portion of the vehicle 1. When the vehicle 1 is viewed from a side thereof, the headstock 211 is slightly inclined relative to a vertical direction so that an upper portion is positioned slightly farther rearwards than a lower portion thereof. The steering mechanism 7 and the link mechanism 5 are disposed around the headstock 211. A steering shaft 60 of the steering mechanism 7 is inserted into the headstock 211 so as to be turned therein. The headstock 211 supports the link mechanism 5. The headstock 211, which is a portion of the body frame 21, leans to the right of the vehicle 1 when the vehicle 1 turns right, whereas the headstock 211 leans to the left of the vehicle 1 when the vehicle 1 turns left.

The down frame 212 is connected to the headstock 211. The down frame 212 is disposed behind the headstock 211 and extends along the up-and-down direction. The under frame 214 is connected to a lower portion of the down frame 212. The under frame 214 extends rearwards from the lower portion of the down frame 212. The rear frame 213 is disposed behind the under frame 214 and extends obliquely rearwards and upwards. The rear frame 213 supports the seat 24, the power unit 25, a tail lamp and the like.

The body frame 21 is covered by the body cover 22. The body cover 22 includes a front cover 221, a pair of left and right mudguards 223, a leg shield 225, a center cover 226, and a rear mudguard 224.

The front cover 221 is positioned ahead of the seat 24. The front cover 221 covers at least a portion of the steering mechanism 7 and the link mechanism 5. The front cover 221 includes a front portion 221a that is disposed ahead of the link mechanism 5. In a side view of the vehicle 1 in an unloaded state, the front portion 221a of the front cover 221 is provided above the front wheels 3. In the side view of the vehicle 1 in the unloaded state, the front portion 221a of the front cover 221 is disposed behind front ends of the front wheels 3. The leg shield 225 is disposed below the front cover 221 and ahead of the seat 24. The center cover 226 is disposed so as to cover the circumference of the rear frame 213.

The pair of left and right front mudguards 223 (see FIG. 2) is disposed directly below the front cover 221 and directly above the pair of front wheels 3. The rear mudguard 224 is disposed directly above a rear portion of the rear wheel 4.

The pair of left and right front wheels 3 is disposed below the headstock 211 and directly below the front cover 221 when the vehicle 1 is unloaded. The rear wheel 4 is disposed directly below the center cover 226 and the rear mudguard 224.

Figure 2:
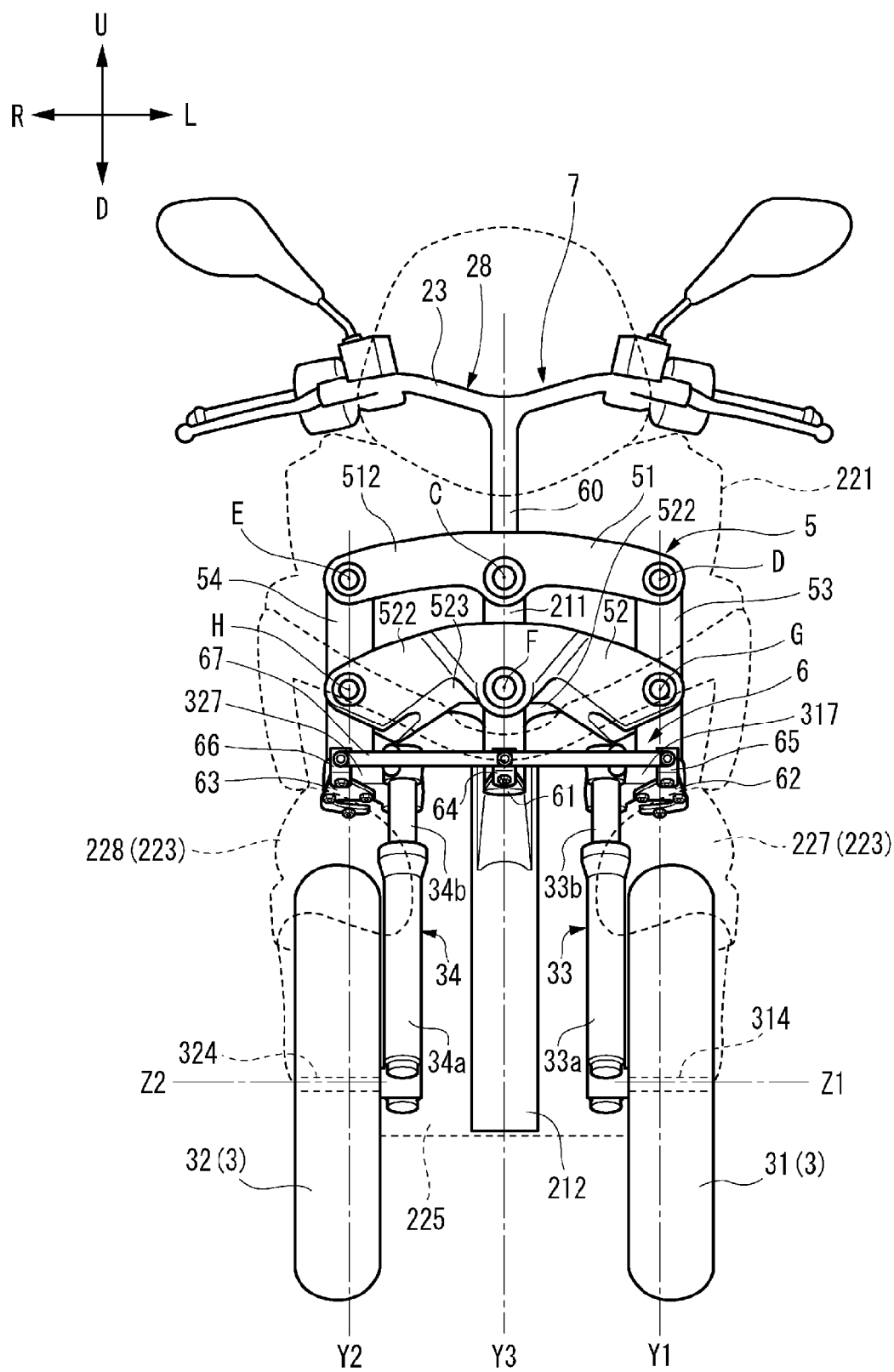
FIG. 2 is a front view of a front portion of the vehicle shown in FIG. 1.
Figure 3:
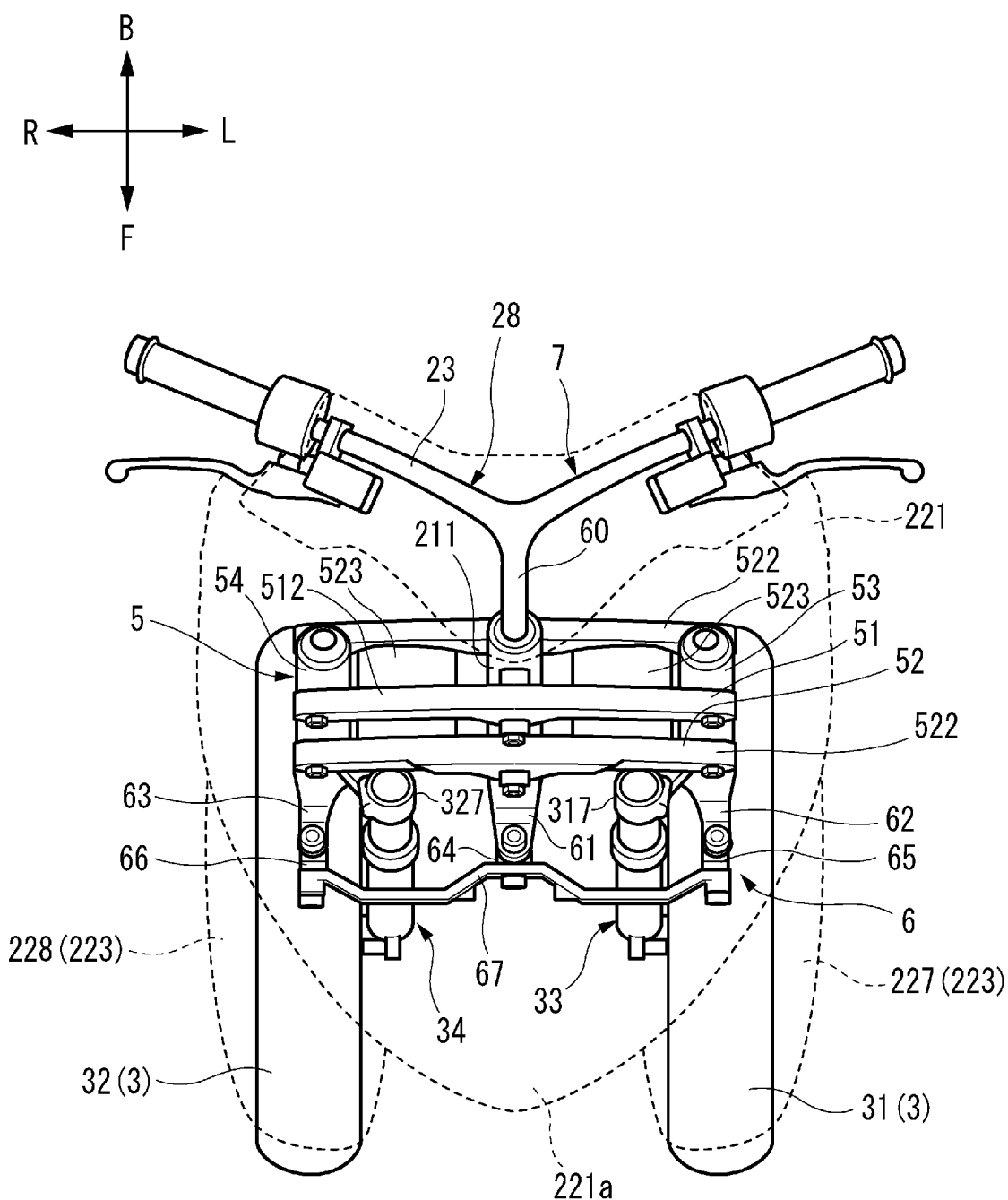
FIG. 3 is a plan view of the front portion of the vehicle shown in FIG. 1.

FIG. 2 is a front view of the front portion of the vehicle 1 shown in FIG. 1 when viewed from the front thereof. FIG. 3 is a plan view of the front portion of the vehicle 1 shown in FIG. 1 when viewed from thereabove. FIGS. 2 and 3 show the front portion of the vehicle 1 as seen through the body cover 22.

As shown in FIGS. 2 and 3, the steering mechanism 7 includes a steering effort transmission mechanism 6, a suspension device, and the pair of left and right front wheels 3. The suspension device includes the link mechanism 5, a left shock absorber 33, and a right shock absorber 34. The suspension device supports a left front wheel 31 and a right front wheel 32 on the body frame 21.

The pair of right and left front wheels 3 includes the left front wheel 31 and the right front wheel 32. The left front wheel 31 and the right front wheel 32 are aligned in a left-and-right direction of the body frame 21. The left front wheel 31 and the right front wheel 32 are disposed symmetrically in the left-and-right direction with respect to a center of the vehicle in relation to the vehicle's width direction. In addition, of the pair of left and right front mudguards 223, a first front mudguard 227 is disposed directly above the left front wheel 31. Of the pair of left and right front mudguards 223, a second front mudguard 228 is disposed directly above the right wheel 32. The left front wheel 31 is supported by the left shock absorber 33. The right front wheel 32 is supported by the right shock absorber 34.

As shown in FIG. 1, the left front wheel 31 includes a left tire 31a and a left wheel member 31b. This left front wheel member 31b supports the left tire 31a and rotates together with a left brake disc 711, which will be described below. The right front wheel 32 includes a right tire 32a and a right wheel member 32b. This right front wheel member 32b supports the right tire 32a and rotates together with a right brake disc 721, which will be described below.

Figure 5:
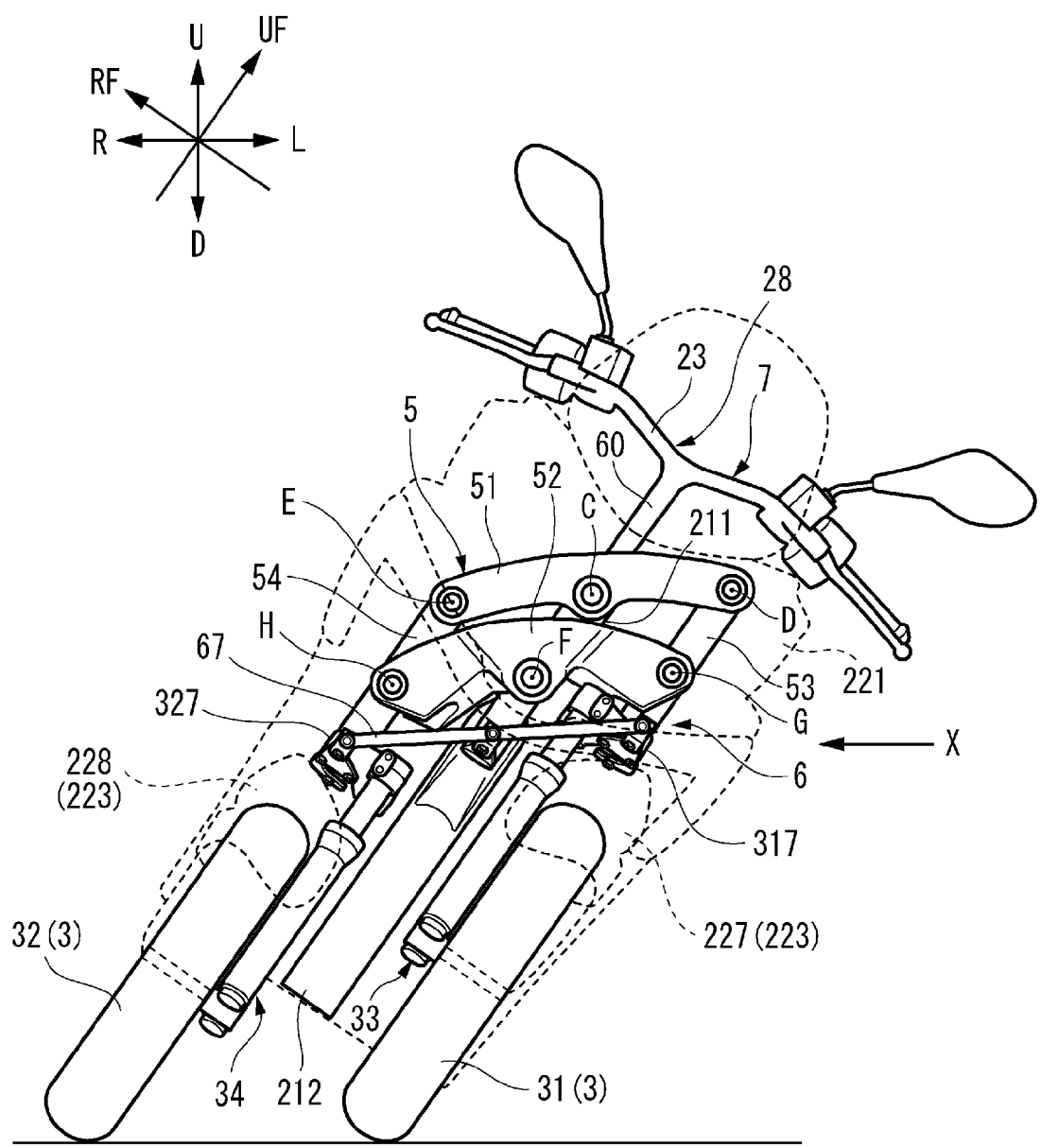
FIG. 5 is a front view of the front portion of the vehicle in a state where the vehicle shown in FIG. 1 is caused to lean.

In this description, the "left-and-right direction of the body frame 21" denotes a direction that intersects at right angles or perpendicular or substantially perpendicular to an axial direction of the headstock 211 when the vehicle 1 is viewed from the front thereof. An up-and-down direction of the body frame 21 denotes a direction which extends in an axial direction of the headstock 211 when the vehicle 1 is viewed from the front thereof. For an example, the up-and-down direction of the body frame 21 coincides with the axial direction of the headstock 211. As shown in FIG. 2, when the vehicle 1 is in an upright state, a rightward direction RF of the body frame 21 coincides with a rightward direction R in a horizontal direction when the vehicle 1 is viewed front the front thereof. Because of this, only the rightward direction R in the horizontal direction is shown in FIG. 2. As shown in FIG. 5, when the vehicle 1 leans relative to a road surface, when the vehicle 1 is viewed from the front thereof, the rightward direction RF of the body frame 21 does not coincide with the rightward direction R in the horizontal direction, and an upward direction UF of the body frame 21 does not coincide with an upward direction U in the vertical direction.

The left shock absorber 33 is preferably a so-called telescopic shock absorber and dampens vibrations from the road surface. The left shock absorber 33 supports the left front wheel 31 at a lower portion thereof and absorbs an upward displacement of the left front wheel 31 in the up-and-down direction of the body frame 21. The left shock absorber 33 includes a first lower-side portion 33a and a first upper-side portion 33b. The left front wheel 31 is supported on the first lower-side portion 33a. The first lower-side portion 33a extends in the up-and-down direction, and a left wheel axle 314 is supported on a lower end side of the first lower-side portion 33a. The left wheel axle 314 supports the left front wheel 31. The first upper-side portion 33b is disposed at an upper side of the first lower-side portion 33a when the first upper-side portion 33b is partially inserted into the first lower-side portion 33a. The first upper-side portion 33b moves relative to the first lower-side portion 33a in a direction in which the first lower-side portion 33a extends. The upper portion of the first upper-side portion 33b is fixed to the left bracket 317.

The first lower-side portion 33a and the first upper-side portion 33b define two telescopic elements that are aligned parallel in the front-and-rear direction and are connected together. This configuration prevents the first upper-side portion 33b from turning relative to the first lower-side portion 33a.

The right shock absorber 34 is preferably a so-called telescopic shock absorber and dampens vibrations from the road surface. The left shock absorber 34 supports the right front wheel 32 at a lower portion thereof and absorbs an upward displacement of the right front wheel 32 in the up-and-down direction of the body frame 21. The right shock absorber 34 has a second lower-side portion 34a and a second upper-side portion 34b. The right front wheel 32 is supported on the second lower-side portion 34a. The second lower-side portion 34a extends in the up-and-down direction, and a right wheel axle 324 is supported on a lower end side of the second lower-side portion 34a. The right wheel axle 324 supports the right front wheel 32. The second upper-side portion 34b is disposed at an upper side of the second lower-side portion 34a when the second upper-side portion 34b is partially inserted into the second lower-side portion 34a. The second upper-side portion 34b moves relative to the second lower-side portion 34a in a direction in which the second lower-side portion 34a extends. The upper portion of the second upper-side portion 34b is fixed to the right bracket 327.

The second lower-side portion 34a and the second upper-side portion 34b define two telescopic elements that are aligned parallel in the front-and-rear direction and are connected together. This configuration prevents the second upper-side portion 34b from turning relative to the second lower-side portion 34a.

The steering effort transmission mechanism 6 is disposed above the left front wheel 31 and the right front wheel 32. The steering effort transmission mechanism 6 includes a steering member 28 as a member which inputs steering effort made by the rider. The steering member 28 includes the steering shaft 60 and a handlebar 23 that is connected to an upper portion of the steering shaft 60. The steering shaft 60 is disposed so that the steering shaft 60 is partially inserted into the headstock 211 and extends substantially in the up-and-down direction. The steering shaft 60 is turned relative to the headstock 211. The steering shaft 60 is turned in association with the rider turning the handlebar 23.

In addition to the steering member 28, the steering effort transmission mechanism 6 includes a first transmission plate 61, a second transmission plate 62, a third transmission plate 63, a first joint 64, a second joint 65, a third joint 66, a tie rod 67, a left bracket 317, and a right bracket 327. The steering transmission mechanism 6 transmits a steering force by which the rider operates the handle bar 23 to the left bracket 317 and the right bracket 327 via these members.

The first transmission plate 61 is disposed at the center in the vehicle's width direction and is connected to the steering shaft 60 so as not to turn relative to the steering shaft 60. The first transmission plate 61 turns as the steering shaft 60 turns.

The second transmission plate 62 is connected to a left side portion 53 of the link mechanism 5, which will be described below, so as to turn relatively. The second transmission plate 62 is fixed to the left bracket 317. The second transmission plate 62 is positioned below the left bracket 317. The second transmission plate 62 is disposed on the left of the first transmission plate 61.

The third transmission plate 63 is connected to a right side portion 54 of the link mechanism 5, which will be described below, so as to turn relatively. The third transmission plate 63 is disposed symmetrical with the second transmission plate 62 in the left-and-right direction with respect to the first transmission plate 61. The third transmission plate 63 is fixed to the right bracket 327. The third transmission plate 63 is disposed below the right bracket 327.

The first joint 64 is disposed at a front portion of the first transmission plate 61. The first joint 64 is supported by a turning shaft that extends in the up-and-down direction so as to turn relative to the first transmission plate 61. The second joint 65 is disposed at a front portion of the second transmission plate 62. The second joint 65 is supported by a turning shaft that extends in the up-and-down direction so as to turn relative to the second transmission plate 62. The third joint 66 is disposed at a front portion of the third transmission plate 63. The third joint 66 is supported by a turning shaft that extends in the up-and-down direction so as to turn relative to the third transmission plate 63. The first joint 64, the second joint 65, and the third joint 66 each include a shaft portion that extends in the front-and-rear diction at a front portion thereof.

The tie rod 67 extends in the vehicle's width direction. The tie-rod 67 is supported so as to turn relative to the shaft portions that extend in the front-and-rear direction at the front portions of the first joint 64, the second joint 65, and the third joint 66.

The steering effort transmission mechanism 6 described above transmits the steering effort transmitted from the steering member 28 to the tie rod 67 by way of the first transmission plate 61 and the first joint 64. This causes the tie rod 67 to be displaced either leftwards or rightwards. The steering effort transmitted to the tie rod 67 is transmitted from the tie rod 67 to the left bracket 317 via the second transmission plate 62 and the second joint 65. Further, the steering effort transmitted to the tie rod 67 is transmitted from the tie rod 67 to the right bracket 327 via the third transmission plate and the third joint 66. Thus, the left bracket 317 and the right bracket 327 turns in a direction in which the tie rod 67 shifts.

In the present preferred embodiment, the link mechanism 5 preferably uses a four-joint parallel link system (also, called a parallelogram link).

The link mechanism 5 defines a portion of the suspension device. The link mechanism 5 is disposed below the handlebar 23. The link mechanism 5 is connected to the headstock 211 of the body frame 21. The link mechanism 5 includes an upper cross portion 51, a lower cross portion 52, the left side portion 53, and the right side portion 54 as a configuration which enables the vehicle 1 to lean. Further, the link mechanism 5 includes the left bracket 317 and the left shock absorber 33 as a configuration which is connected to the lower portion of the left side portion 53 and leans together with the left side portion 53. Further, the link mechanism 5 includes the right bracket 327 and the right shock absorber 34 as a configuration which is connected to the lower portion of the right side portion 54 and leans together with the right side portion 54.

The right side portion 54 supports an upper portion of the right shock absorber 34 so as to turn about a right steering axis Y2 that extends in the up-and-down direction of the body frame 21. The left side portion 53 supports an upper portion of the left shock absorber 33 so as to turn a left steering axis Y1 that is parallel to the right steering axis Y2.

The upper cross member 51 supports at a right end portion thereof an upper portion of the right side portion 54 so as to turn about an upper right axis E that extends in the front-and-rear direction of the body frame 21 and supports at a left end portion thereof an upper portion of the left side portion 53 so as to turn about an upper left axis D that is parallel to the upper right axis E and is supported at a middle portion thereof on the body frame 21 so as to turn about an upper middle axis C that is parallel to the upper right axis E and the upper left axis D.

The lower cross member 52 supports at a right end portion thereof a lower portion of the right side portion 54 so as to turn about a lower right axis H that is parallel to the upper right axis E and supports at a left end portion thereof a lower portion of the left side portion 53 so as to turn about a lower left axis G that is parallel to the upper left axis D and is supported at a middle portion thereof on the body frame 21 so as to turn about a lower middle axis F that is parallel to the upper middle axis C.

The upper cross portion 51 includes a plate-shaped member 512. This plate-shaped member 512 is disposed directly ahead of the headstock 211 and extends in the vehicle's width direction. The plate-shaped member 512 is supported on the headstock 211 by a supporting portion and turns relative to the headstock 211 about the upper middle axis C that extends substantially in the front-and-rear direction.

A left end of the upper cross portion 51 is connected to the left side portion 53 by a supporting portion. The upper cross portion 51 turns relative to the left side portion 53 about the upper left axis D that extends substantially in the front-and-rear direction. A right end of the upper cross portion 51 is connected to the right side portion 54 by a connecting portion. The upper cross portion 51 turns relative to the right side portion 54 about the upper right axis E that extends substantially in the front-and-rear direction.

The lower cross portion 52 is supported on the headstock 211 by a supporting portion and turns about the lower middle axis F that extends substantially in the front-and-rear direction. The lower cross portion 52 is disposed below the upper cross portion 51. The lower cross portion 52 has substantially the same widthwise length as that of the upper cross portion 51 in relation to the vehicle's width direction and is disposed parallel to the upper cross portion 51.

The lower cross portion 52 includes a pair of plate-shaped members 522, 522 that extend in the vehicle's width direction. The pair of plate-shaped members 522, 522 is disposed so as to hold the headstock 211 therebetween in the front-and-rear direction. The pair of plate-shaped members 522, 522 is connected integrally to each other by a middle portion 523. The middle portion 523 may be integral with or separate from the pair of plate-shaped members 522, 522. A left end of the lower cross portion 52 is connected to the left side portion 53 by a supporting portion. The lower cross portion 52 turns relative to the left side portion 53 about the lower left axis G that extends substantially in the front-and-rear direction. A right end of the lower cross portion 52 is connected to the right side portion 54 by a supporting portion. The lower cross portion 52 turns relative to the right side portion 54 about the lower right axis H that extends substantially in the front-and-rear direction.

The left side portion 53 is disposed directly on the left of the headstock 211 and extends parallel to the direction in which the headstock 211 extends. The left side portion 53 is disposed directly above the left front wheel 31 and above the left shock absorber 33. The lower portion of the left side portion 53 is connected to the left bracket 317 and the left side portion 53 is attached to the left bracket 317 so as to turn around the left steering axis Y1.

The right side portion 54 is disposed directly on the right of the headstock 211 and extends in the direction in which the headstock 211 extends. The right side portion 54 is disposed directly above the right front wheel 32 and above the right shock absorber 34. The lower portion of the right side portion 54 is connected to the right bracket and the right side portion 54 is attached to the right bracket 327 so as to turn around the right steering axis Y2.

In this way, the upper cross portion 51, the lower cross portion 52, the left side portion 53, and the right side portion 54 are connected together in such a posture that the upper cross portion 51 and the lower cross portion 52 become parallel to each other and that the left side portion 53 and the right side portion 54 become parallel to each other.

Figure 4:
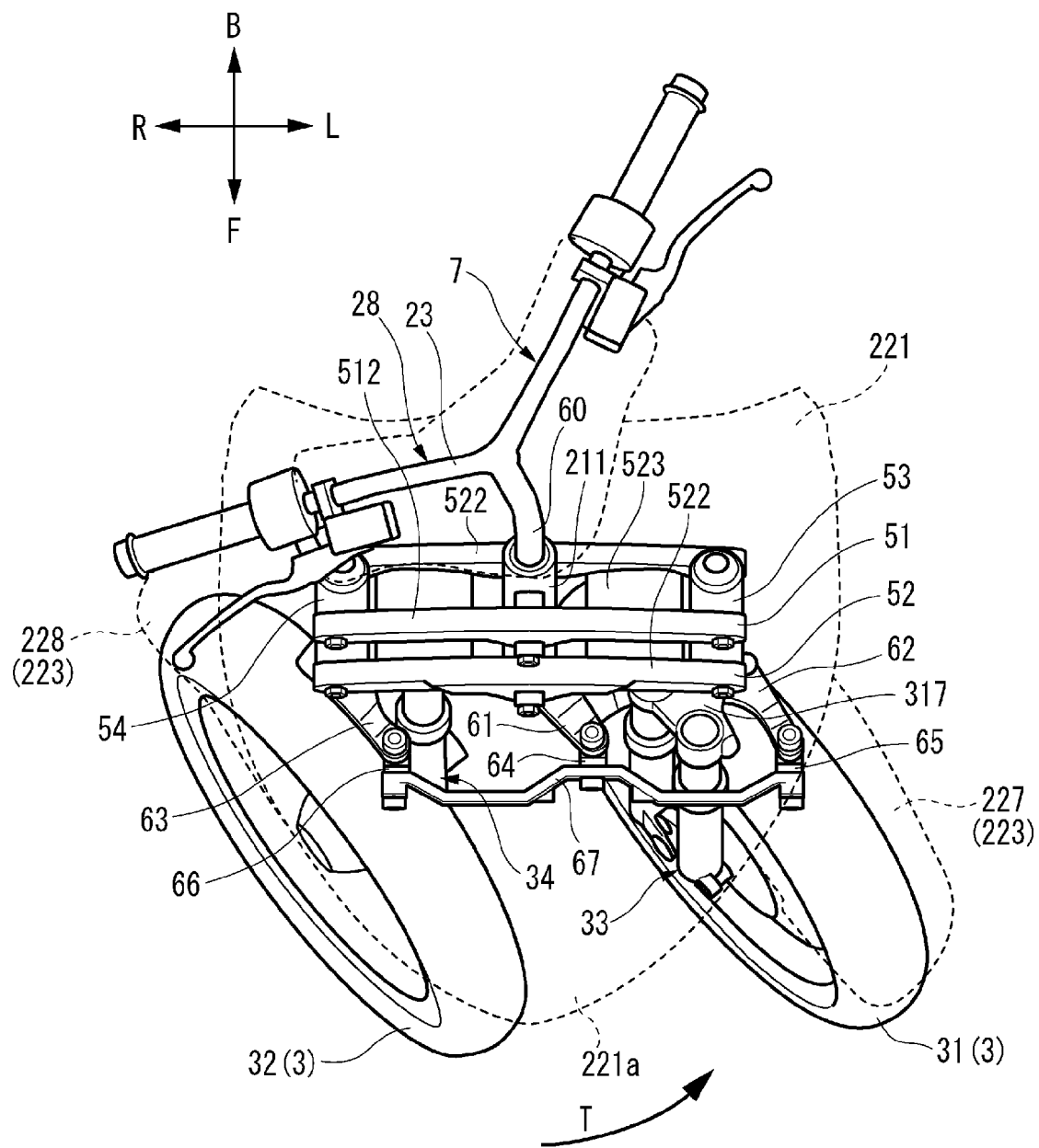
FIG. 4 is a plan view of the front portion of the vehicle in a state where the vehicle shown in FIG. 1 is steered.

FIG. 4 is a plan view of the front portion of the vehicle 1 when the vehicle 1 is steered to be turned, depicting the steering operation of the vehicle 1.

As shown in FIG. 4, when the handlebar 23 is turned left or right, the steering effort transmission mechanism 6 of the steering mechanism 7 is activated to perform a steering operation. When the steering shaft 60 turns as a result of the handlebar 23 being turned, the first transmission plate 61 turns as the steering shaft 60 turns.

For example, when the steering shaft 60 turns in a direction indicated by an arrow T in FIG. 4, the tie-rod 67 moves leftwards and rearwards in association with the turning of the first transmission plate 61. As this occurs, the first transmission plate 61 is allowed to turn relative to the first joint 64 by the turning shaft that extends in the up-and-down direction of the first joint 64, and the tie-rod 67 moves to the left rear while maintaining its posture. The second transmission plate 62 and the third transmission plate 63 turn in the direction indicated by the arrow T about the left side portion 53 and the right side portion 54, respectively, as the tie-rod 67 moves leftwards and rearwards. As this occurs, the second transmission plate 62 turns relative to the second joint 65 about the rotating shaft of the second joint 65 that extends in the up-and-down direction, and the third transmission plate 63 turns relative to the third joint 66 about the rotating shaft of the third joint 66 that extends in the up-and-down direction.

When the second transmission plate 62 and the third transmission plate 63 turn in a direction of an arrow T, the left bracket 317 and the right bracket 327 turn in the direction of the arrow T. When the left bracket 317 and the right bracket 327 turn in the direction of the arrow T, the left front wheel 31 turns around the left steering axis Y1 (see FIG. 2) via the left shock absorber 33 and the right front wheel 32 turns around the right steering axis Y2 (see FIG. 2) via the right shock absorber 34.

FIG. 5 is a front view of the front portion of the vehicle 1 when the vehicle 1 is steered to be turned, depicting a leaning operation of the vehicle 1.

As shown in FIG. 5, the vehicle 1 leans to the left or right as the link mechanism 5 operates. The operation of the link mechanism 5 means that the individual members (the upper cross portion 51, the lower cross portion 52, the left side portion 53, and the right side portion 54) that activate a leaning operation in the link mechanism 5 turn relatively about their connecting points as axes so as to change the shape of the link mechanism 5.

In the link mechanism 5 of the present preferred embodiment, for example, the upper cross portion 51, the lower cross portion 52, the left side portion 53, and the right side portion 54 which define a rectangular or a substantially rectangular shape when viewed from the front with the vehicle 1 being in the upright state turn to change their shape that they move substantially into a parallelogram shape when the vehicle leans. The link mechanism 5 performs a leaning operation in association with the relative turning operation of the upper cross portion 51, the lower cross portion 52, the left side portion 53, and the right side portion 54 to cause the left front wheel 31 and the right front wheel 32 to lean accordingly.

For example, when the rider causes the vehicle 1 to lean to the left, the headstock 211 leans to the left of the vehicle 1 from the vertical direction. When the headstock 211 leans, the upper cross portion 51 turns relative to the headstock 211 about the upper middle axis C, and the lower cross portion 52 turns relative to the headstock 211 about the lower middle axis F. Then, the upper cross portion 51 moves further leftwards than the lower cross portion 52, and the left side portion 53 and the right side portion 54 lean from the vertical direction while being kept parallel to the headstock 211. The left side portion 53 and the right side portion 54 turn relative to the upper cross portion 51 and the lower cross portion 52 when the left side portion 53 and the right side portion 54 lean. Consequently, when the vehicle 1 is caused to lean, the left front wheel 31 and the right front wheel 32 that are supported on the left side portion 53 and the right side portion 54, respectively, lean while being kept parallel to the headstock 211 relative to the vertical direction as the left side portion 53 and the right side portion 54 lean.

In addition, during the leaning operation, the tie-rod 67 turns relative to the shaft portions of the first joint 64, the second joint 65 and the third joint 66 that extend in the front-and-rear direction. This allows the tie rod 67 to maintain its parallel posture to the upper cross portion 51 and the second cross portion 52 even though the vehicle 1 leans.

In this way, the link mechanism 5 leans to cause the left front wheel 31 and the right front wheel 32 to lean and is disposed directly above the left front wheel 31 and the right front wheel 32. Namely, the turning shafts of the upper cross portion 51, the lower cross portion 52, the left side portion 53, and the right side portion 54 that are turning members that define the link mechanism 5 are disposed above the left front wheel 31 and the right front wheel 32.

Figure 6:
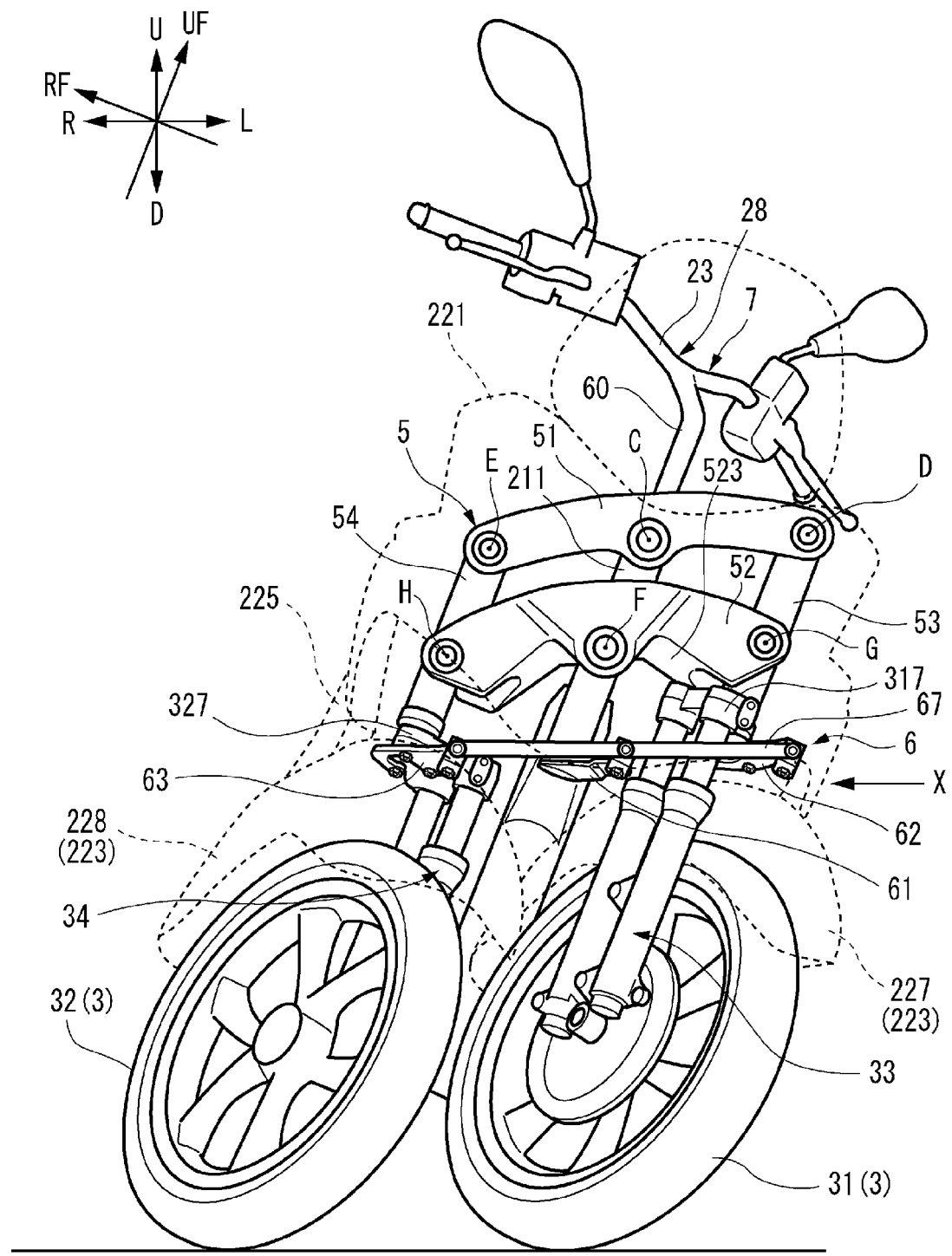
FIG. 6 is a front view of the front portion of the vehicle in a state where the vehicle shown in FIG. 1 is steered and is caused to lean.

FIG. 6 is a front view of the front portion of the vehicle 1 when the vehicle 1 is steered and caused to lean.

In FIG. 6, the vehicle 1 is steered to the left and is caused to lean to the left thereof. When the vehicle 1 operates as illustrated in FIG. 6, the directions of the left front wheel 31 and the right front wheel 32 are changed by the steering operation, and both the left front wheel 31 and the right front wheel 32 are caused to lean together with the body frame 21 by the leaning operation. In this state, the upper cross portion 51, the lower cross portion 52, the left side portion 53, and the right side portion 54 of the link mechanism 5 are turned to change their shape that they move substantially into a parallelogram shape, so that the tie-rod 67 moves leftwards or rightwards, that is, in a direction in which the vehicle 1 is steered (leftwards in FIG. 6) and rearwards.

Figure 7:
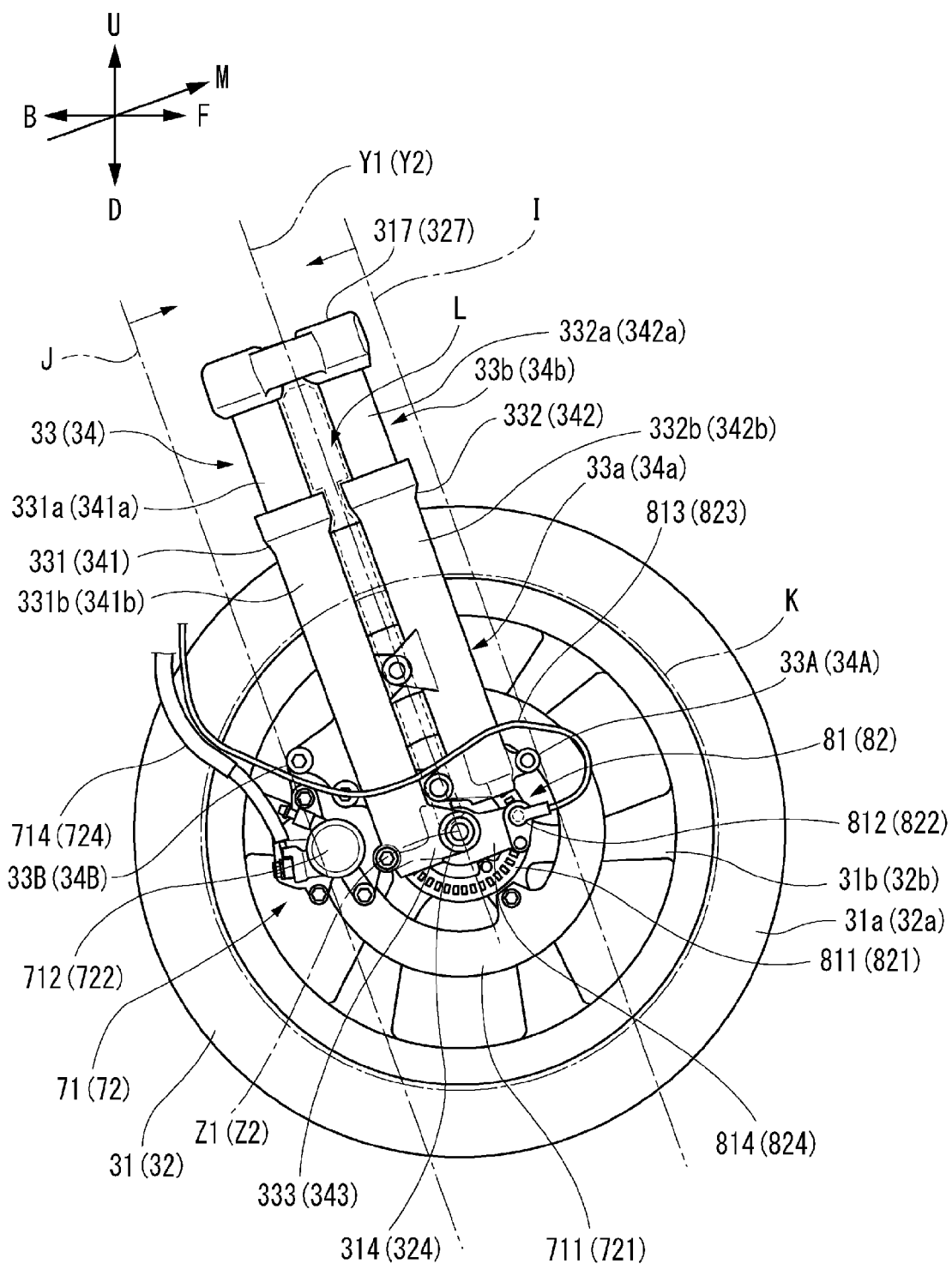
FIG. 7 is a side view of the left front wheel as viewed from the right front wheel.

FIG. 7 is a side view of the left front wheel 31 as viewed from the right front wheel 32. In FIG. 7, only the left front wheel 31 and members provided therearound are shown, and as to the right front wheel 32 and members provided therearound, only reference numerals denoting the right front wheel 32 and members provided therearound are given, and the illustration thereof is omitted here. In the present preferred embodiment, the shapes and positional relationship of the right front wheel 32 and the members that are disposed therearound are symmetrical laterally with the shapes and positional relationship of the left front wheel 31 and the members that are disposed therearound. Thus, as a matter of convenience, the right front wheel 32 and the members provided therearound will be described by reference to FIG. 7.

The suspension device includes a left telescopic element which supports the left front wheel 31 so as to be displaced linearly and a right telescopic element which supports the right front wheel 32 so as to be displaced linearly.

As shown in FIG. 7, the left shock absorber 33 (an example of a left shock absorbing device), which is a portion of the suspension device, includes the left telescopic element. The left telescopic element includes a left rear telescopic element 331, a left front telescopic element 332, the left bracket 317 (an example of a connecting portion), and a left axle support portion 333 (an example of the connecting portion).

The left rear telescopic element 331 and the left front telescopic element 332 are connected together while being aligned in the front-and-rear direction. A lower portion of the left rear telescopic element 331 and a lower portion of the left front telescopic element 332 define a first lower portion 33a. An upper portion of the left rear telescopic element 331 and an upper portion of the left front telescopic element 332 define a first upper portion 33b. The left rear telescopic element 331 and the left front telescopic element 332 are disposed farther rightwards of the body frame 21 than the left front wheel 31.

The left rear telescopic element 331 includes a cylindrical left rear inner element 331a and a cylindrical left rear outer element 331b. At least a portion of the left rear inner element 331a is positioned above the left rear outer element 331b in relation to the direction of the left steering axis Y1. A portion of the left rear inner element 331a is inserted into the left rear outer element 331b.

The left front telescopic element 332 includes a cylindrical left front inner element 332a and a cylindrical left front outer element 332b. At least a portion of the left front inner element 332a is positioned above the left front outer element 332b in relation to the direction of the left steering axis Y1. A portion of the left front inner element 332a is inserted into the left front outer element 332b.

The left rear telescopic element 331 has an extending and contracting construction in which the left rear telescopic element 331 extends and contracts along the direction of the left steering axis Y1. An elastic member (not shown) such as a spring and a damping member (not shown) such as oil or the like are provided in an interior of the left rear telescopic element 331. The left rear telescopic element 331 has a function to absorb vibrations or impacts from the left front wheel 31.

The left front telescopic element 332 is disposed ahead of the left rear telescopic element 331. The left front telescopic element 332 has an extending and contracting construction in which the left front telescopic element 332 extends and contracts along the direction of the left steering axis Y1.

Upper portions of the left rear telescopic element 331 and the left front telescopic element 332 are connected together by the left bracket 317. Lower portions of the left rear telescopic element 331 and the left front telescopic element 332 are connected together by the left axle support portion 333.

The left front telescopic element 332 is shorter than the left rear telescopic element 331 in the direction of the left steering axis Y1. A left wheel axle supporting portion 333 that supports rotatably the left wheel axle 314 is disposed below the lower end portion of the left front telescopic element 332.

As shown in FIG. 7, the right shock absorber 34 (an example of a right shock absorbing device), which is a portion of the suspension device, includes the right telescopic element. The right telescopic element includes a right rear telescopic element 341, a right front telescopic element 342, the right bracket 327 (an example of a connecting portion), and a right axle support portion 343 (an example of the connecting portion).

The right rear telescopic element 341 and the right front telescopic element 342 are connected together while being aligned in the front-and-rear direction. A lower portion of the right rear telescopic element 341 and a lower portion of the left front telescopic element 342 define a second lower portion 34a. An upper portion of the right rear telescopic element 341 and an upper portion of the right front telescopic element 342 define a second upper portion 34b. The right rear telescopic element 341 and the right front telescopic element 342 are disposed farther leftwards of the body frame 21 than the right front wheel 32.

The right rear telescopic element 341 includes a cylindrical right rear inner element 341a and a cylindrical right rear outer element 341b. At least a portion of the right rear inner element 341a is positioned above the right rear outer element 341b in relation to the direction of the right steering axis Y2. A portion of the right rear inner element 341a is inserted into the right rear outer element 341b.

The right front telescopic element 342 includes a cylindrical right front inner element 332a and a cylindrical right front outer element 342b. At least a portion of the right front inner element 342a is positioned above the right front outer element 342b in relation to the direction of the right steering axis Y2. A portion of the right front inner element 342a is inserted into the right front outer element 342b.

The right rear telescopic element 341 has an extending and contracting construction in which the right rear telescopic element 341 extends and contracts along the direction of the right steering axis Y2. An elastic member (not shown) such as a spring and a damping member (not shown) such as oil or the like are provided in an interior of the right rear telescopic element 341. The right rear telescopic element 341 absorbs vibrations or impacts from the right front wheel 32.

The right front telescopic element 342 is disposed ahead of the right rear telescopic element 341. The right front telescopic element 342 has an extending and contracting construction in which the right front telescopic element 342 extends and contracts along the direction of the right steering axis Y2.

An upper portion of the right rear telescopic element 341 and an upper portion of the right front telescopic element 342 are connected together by the right bracket 327. A lower portion of the right rear telescopic element 341 and a lower portion of the right front telescopic element 342 are connected together by the right axle support portion 343.

The right front telescopic element 342 is shorter than the right rear telescopic element 341 in the direction of the right steering axis Y2. A right wheel axle supporting portion 343 that supports rotatably the right wheel axle 324 is disposed below the lower end portion of the right front telescopic element 342.

As shown in FIG. 7, a left disc brake 71 (an example of a left brake device) is provided on the left front wheel 31. The left disc brake 71 brakes the left front wheel 31. The left disc brake 71 includes a left brake disc 711 that is provided on the left front wheel 31 and a left brake caliper 712 that brakes the rotation of the left brake disc 711.

The left brake disc 711 preferably has a ring shape which is centered at the left wheel axle 314. The left brake disc 711 is fixed to the left front wheel 31.

The left brake caliper 712 is provided on the left shock absorber 33. The left brake caliper 712 is fixed to the end portion of the left rear telescopic element 331 of the left shock absorber 33. The left brake caliper 712 is provided at a rear portion of the end portion of the left rear telescopic element 331 of the left shock absorber 33. A brake hose 714 is connected to the left brake caliper 712. A brake fluid is supplied into the left brake caliper 712 by way of the brake hose 714 so that a hydraulic pressure is provided to the left brake caliper 712. The left brake caliper 712 includes a left-right brake pad which is positioned directly on the right of the left brake disc 711 and a left-left brake pad which is positioned directly on the left of the left brake disc 711. As a result of the hydraulic pressure being applied to the left brake caliper 712, the left brake caliper 712 presses the left-right brake pad and the left-left brake pad against both surfaces of the left brake disc 711. The left brake caliper 712 holds the left disc brake 711 by the left-right brake pad and the left-left brake pad therebetween to brake the left disc brake 711 that is rotating.

A right disc brake 72 is provided on the right front wheel 32. The right disc brake 72 brakes the right front wheel 32. The right disc brake 72 includes a right brake disc 721 that is provided on the right front wheel 32 and a right brake caliper 722 that brakes the rotation of the right brake disc 721.

The right brake disc 721 preferably has a ring shape which is centered at the right wheel axle 324. The right brake disc 721 is fixed to the right front wheel 32.

The right brake caliper 722 is provided on the right shock absorber 34. The right brake caliper 722 is fixed to the end portion of the right rear telescopic element 341 of the right shock absorber 34. The right brake caliper 722 is fixed to the end portion of the right rear telescopic element 341 of the right shock absorber 34. A brake hose 724 is connected to the right brake caliper 722. A brake fluid is supplied to the right brake caliper 722 by way of the brake hose 724 so that a hydraulic pressure is provided to the right brake caliper 722. The right brake caliper 722 includes a right-right brake pad which is positioned directly on the right of the right brake disc 721 and a right-left brake pad which is positioned directly on the left of the right brake disc 721. As a result of the hydraulic pressure being applied to the right brake caliper 722, the right brake caliper 722 presses the right-right brake pad and the right-left brake pad against both surfaces of the right brake disc 721. The right brake caliper 722 holds the right brake disc 721 to brake the right brake disc 721 which is rotating.

The vehicle 1 according to the present preferred embodiment includes a left wheel speed sensor 81 (an example of a front wheel rotation speed detector) which measures a rotation speed of the left front wheel 31 and a right wheel speed sensor 82 (an example of the front wheel rotation speed detector) which measures a rotation speed of the right front wheel 32.

As shown in FIG. 7, the left wheel speed sensor 81 includes a left sensor disc 811 (an example of a detected portion) that rotates together with the left front wheel 31 and a left detecting portion 812 (an example of a detecting portion) that is provided on the suspension device. The left sensor disc 811 preferably has a ring shape that is centered at the left wheel axle 314. The left sensor disc 811 is smaller in diameter than the left brake disc 711. The left sensor disc 811 is disposed farther inwards than an outer circumferential edge of the left brake disc 711. The left sensor disc 811 is fixed to the left front wheel 31. The left detecting portion 812 detects a rotation of the left sensor disc 811 optically or magnetically, for example. A sensor cord 813 is connected to the left detecting portion 812. A detected value of the left detecting portion 812 is transmitted through the sensor cord 813. A wheel speed of the left front wheel 31 is measured based on the detected value of the left detecting portion 812 that is transmitted via the sensor cord 813.

A left sensor stay 814 is fixed to a right surface of the left axle support portion 333. The left detecting portion 812 of the left wheel speed sensor 81 is supported on the left sensor stay 814. The left sensor stay 814 has a rigidity such that the detection accuracy of the left detecting portion 812 of the left wheel speed sensor 81 is maintained sufficiently even though the left shock absorber 33 vibrates while the vehicle 1 is running.

The left detecting portion 812 of the left wheel speed sensor 81 is disposed ahead of the left wheel axle 314. The left brake caliper 712 of the left disc brake 71 is disposed ahead of the left wheel axle 314. In the front-and-rear direction, the left wheel axle 314 is disposed between the left detecting portion 812 and the left brake caliper 712. The left detecting portion 812 is disposed so that at least a portion thereof overlaps an axial extension of the left front telescopic element 332.

The right wheel speed sensor 82 includes a right sensor disc 821 (an example of a detected portion) that rotates together with the right front wheel 32 and a right detecting portion 822 (an example of a detecting portion) that is provided on the suspension device. The right sensor disc 821 preferably has a ring shape that is centered at the right wheel axle 324. The right sensor disc 821 is smaller in diameter than the right brake disc 721. The right sensor disc 821 is disposed farther inwards than an outer circumferential edge of the right brake disc 721. The right sensor disc 821 is fixed to the right front wheel 32. The right detecting portion 822 detects a rotation of the right sensor disc 821 optically or magnetically, for example. A sensor cord 823 is connected to the right detecting portion 822. A detected value of the right detecting portion 822 is transmitted through the sensor cord 823. A wheel speed of the right front wheel 32 is measured based on the detected value of the right detecting portion 822 that is transmitted via the sensor cord 823.

A right sensor stay 824 is fixed to a left surface of the right axle support portion 343. The right detecting portion 822 of the right wheel speed sensor 82 is supported on the right sensor stay 824. The right sensor stay 824 has such a rigidity that the detection accuracy of the right detecting portion 822 of the right wheel speed sensor 82 is maintained sufficiently even though the right shock absorber 34 vibrates while the vehicle 1 is running.

The right detecting portion 822 of the right wheel speed sensor 82 is disposed ahead of the right wheel axle 324. The right brake caliper 722 of the right disc brake 72 is disposed ahead of the right wheel axle 324. In the front-and-rear direction, the right wheel axle 324 is disposed between the right detecting portion 822 and the right brake caliper 722. The right detecting portion 822 is disposed so that at least a portion thereof overlaps an axial extension of the right front telescopic element 342.

In the present preferred embodiment, as shown in FIG. 7, at least a portion of the left detecting portion 812 of the left front wheel rotation speed detector 81 is supported on the left front telescopic element 332 of the left shock absorber 33 and is positioned in, as viewed in the direction of the left wheel axis Z1, (a) an area which is defined by a front imaginary line I which passes a front end 33A of the left shock absorber 33 and which is parallel to the left steering axis Y1 and a rear imaginary line J which passes a rear end 33B of the left shock absorber 33 and which is parallel to the left steering axis Y1 in a perpendicular or substantially perpendicular direction M to the wheel axis Z1 and the left steering axis Y1, (b) an area which is located inwards of an external shape K of the left wheel 31b, and (c) an area which is located outside the area L defined between the left front telescopic element 332 and the left rear telescopic element 331.

As to (c), more specifically, as shown in FIG. 7, at least a portion of the left detecting portion 812 of the left front wheel rotation speed detector 81 is disposed, as viewed in the direction of the wheel axis Z1, outside the area L which is surrounded by a lower edge of the left bracket 317, a rear edge of the left front inner element 332a, a rear edge of the left front outer element 332b, an upper edge of the left axle support portion 333, a front edge of the left rear outer element 331b, and a front edge of the left rear inner element 331a.

As shown in FIG. 7, at least a portion of the right detecting portion 822 of the right front wheel rotation speed detector 82 is supported on the right front telescopic element 342 of the right shock absorber 34 and is positioned in, as viewed in the direction of the wheel axis Z2, (a) an area which is defined by a front imaginary line I which passes a front end 34A of the right shock absorber 34 and which is parallel to the right steering axis Y2 and a rear imaginary line J which passes a rear end 34B of the right shock absorber 34 and which is parallel to the right steering axis Y2 in a perpendicular or substantially perpendicular direction M to the right wheel axis Z2 and the right steering axis Y2, (b) an area which is located inwards of an external shape K of the right wheel 32b, and (c) an area which is located outside the area L defined between the right front telescopic element 342 and the right rear telescopic element 341.

As to (c), more specifically, as shown in FIG. 7, at least a portion of the right detecting portion 822 of the right front wheel rotation speed detector 82 is disposed, as viewed in the direction of the wheel axis Z2, outside the area L which is surrounded by a lower edge of the right bracket 327, a rear edge of the right front inner element 342a, a rear edge of the right front outer element 342b, an upper edge of the right axle support portion 343, a front edge of the right rear outer element 341b, and a front edge of the right rear inner element 341a.

Figure 12:
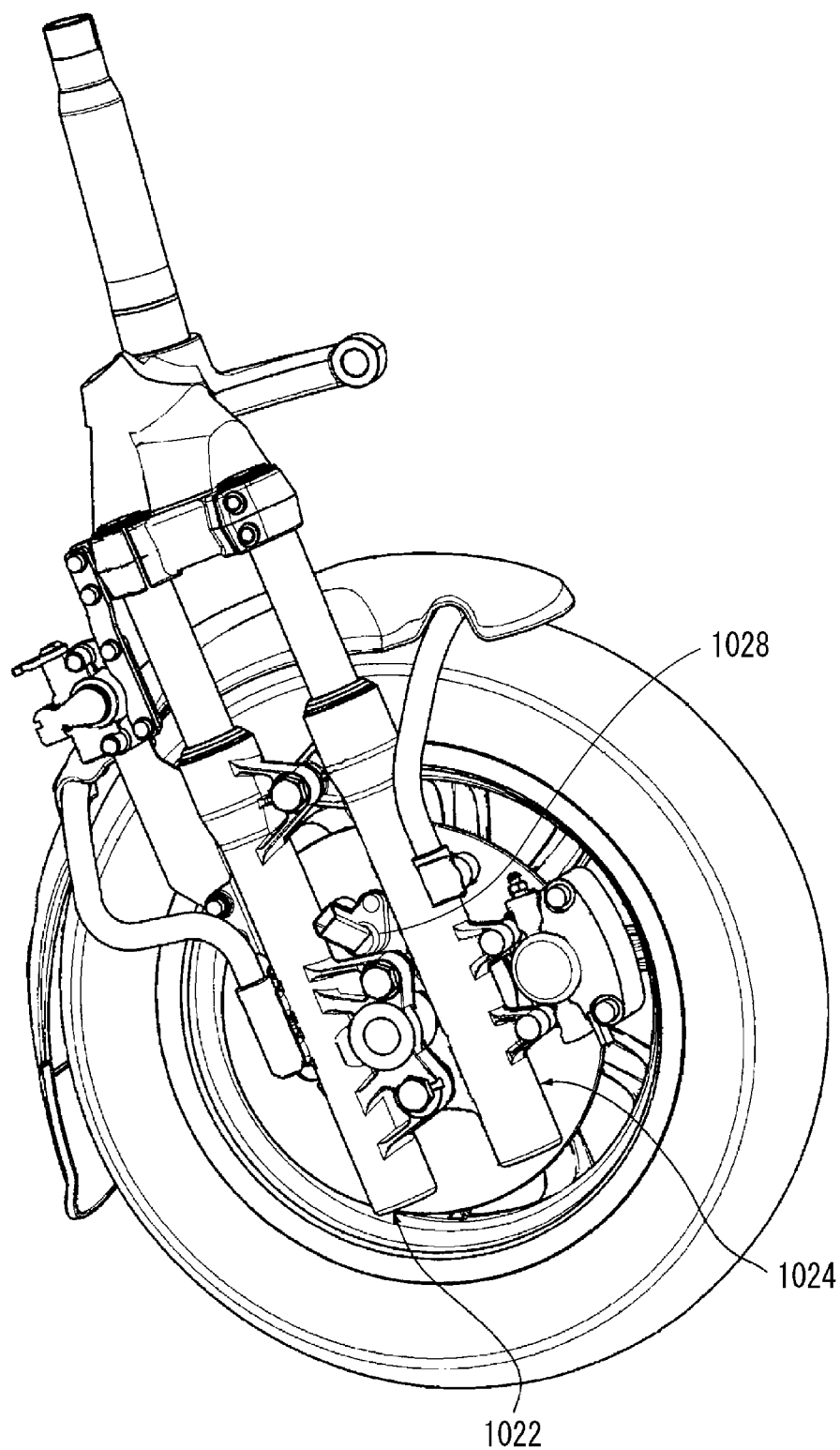
FIG. 12 is a side view of a left front wheel of a vehicle according to a reference example as viewed from a right front wheel thereof.

The inventors have studied extensively the circumferential constructions of the left and right shock absorbers 33, 34 to determine locations of the front wheel rotation speed detectors 81, 82. It has been discovered from the results of the study that in the event that the front wheel rotation speed detector is disposed in the dead space between the front telescopic element and the rear telescopic element as done in International Patent Publication No. 2012/007819 (refer to FIG. 12), the interval between the front telescopic element and the rear telescopic element needs to be expanded slightly. The front wheel rotation speed detector includes, in addition to a sensor main body, a bracket to which the sensor main body is attached and a fastening member to fix the bracket to the vehicle. In order to mount this front wheel rotation speed detector on the vehicle, a bracket where the front wheel rotation speed detector is attached is also provided on the vehicle side. Because of this, when attempting to mount the front wheel rotation speed detector between the front telescopic element and the rear telescopic element, the interval between the front telescopic element and the rear telescopic element needs to be expanded slightly than when no front wheel rotation speed detector is mounted therebetween. At a glance, a slight expansion of the interval between the front telescopic element and the rear telescopic element only enlarges the shock absorbing device itself slightly, and it is considered that the enlargement of the shock absorbing device minimally affects the overall size of the vehicle.

However, the inventors have discovered the following problems during their extensive study. One of the problems that the inventors discovered is that the expansion of the intervals between the front telescopic elements 342, 332 and the rear telescopic elements 341, 331 results in a great increase in the moving ranges of the two pairs of telescopic elements, so that the vehicle 1 tends to be enlarged in size to avoid the interference of the two pairs of telescopic elements with the other parts of the vehicle. This is attributed to the fact that the front telescopic elements 342, 332 and the rear telescopic elements 341, 331 are members which are long in the direction in which they extend and contract and that the front telescopic elements 342, 332 and the rear telescopic elements 341, 331 turn about the steering axes Y2, Y1 along the direction in which they extend and contract when they are fixed to each other. The moving ranges of the front telescopic elements 342, 332 and the rear telescopic elements 341, 331 mean spaces where the front telescopic elements 342, 332 and the rear telescopic elements 341, 331 move when the front telescopic elements 342, 332 and the rear telescopic elements 341, 331 turn in association with a turn of the handlebar 23.

More specifically, when seen from the direction of the right steering axis Y2 and the direction of the left steering axis Y1, the moving space is determined by spaces which connect arc-shaped loci which are drawn by outer edges of the front telescopic elements 342, 332 and the rear telescopic elements 341, 331t and the steering axes Y1, Y2. Therefore, in the event that the intervals between the front telescopic elements 342, 332 and the rear telescopic elements 341, 331 are expanded to increase the external shapes defined by the two pairs of telescopic elements, the moving spaces as seen from the direction of the steering axes Y2, Y1 increase in proportion to the square of the radii thereof which are increased as a result of the expansion of the intervals. Moreover, since the front telescopic elements 342, 332 and the rear telescopic elements 341, 331 are long in the directions of the steering axes Y2, Y1, the moving spaces expressed in terms of volume become very large. Because of this, it has been discovered that in the event that the front wheel rotation speed detector is disposed between the front telescopic element and the rear telescopic element as done in International Patent Publication No. 2012/007819, the moving space tends to become large, causing an enlargement in the size of the vehicle.

Then, the inventors eventually considered a configuration that is different from International Patent Publication No. 2012/007819, wherein the front wheel rotation speed detectors 82, 81 are disposed not in the dead spaces defined between the front telescopic elements 342, 332 and the rear telescopic elements 341, 331 but outside the dead spaces between the two pairs of telescopic elements.

However, in the event that the front wheel rotation speed detectors 81, 82 are simply disposed outside the dead spaces between the front telescopic elements 342, 332 and the rear telescopic elements 341, 331, there are concerns that the moving spaces of the 3-dimensional volume become large. In general, the front wheel rotation speed detectors 82, 81 are elements which are, compared with the front telescopic elements 342, 332 and the rear telescopic elements 341, 331, small in the direction which is perpendicular or substantially perpendicular to the wheel axes Z2, Z1 of the front wheels and the steering axes Y2, Y1 (the direction M which is perpendicular or substantially perpendicular to the wheel axes Z2, Z1 of the front wheels and is perpendicular or substantially perpendicular to the steering axes Y2, Y1) and in the direction of the steering axes Y2, Y1. Then, the inventors discovered that the moving spaces of the front wheel rotation speed detectors 82, 81 and the front telescopic elements 342, 332 and the rear telescopic elements 341, 331 are able to be made small by devising the sizes of the moving spaces as seen from the direction of the steering axes Y2, Y1 and the positions where the front wheel rotation speed detectors 82, 81 are provided in relation to the direction of the steering axes Y2, Y1 by using the relationship in size between the front wheel rotation speed detectors 82, 81 and the front telescopic elements 342, 332 and the rear telescopic elements 341, 331.

The front wheel rotation speed detectors 82, 81 measure rotation speeds of at least the one front wheel 32, 31 of the right front wheel 32 and the left front wheel 31, respectively, and include the detected portions 821, 811 which rotate together with the one front wheels 32, 31, respectively, and the detecting portions 822, 812 which are provided on the right shock absorber 34 and the left shock absorber 33 which support the one front wheels 32, 31, respectively.

At least portions of the detecting portions 822, 812 of the front wheel rotation speed detectors 82, 81 are supported, respectively, on the front telescopic elements 342, 332 or the rear telescopic elements 341, 331 of at least the one shock absorbers 33, 34 of the right shock absorbers 33 and the left shock absorbers 34 in, as viewed in the wheel axes Z2, Z1, (a) the areas which are defined by the front imaginary lines I which pass the front ends 34A, 33A of the one shock absorbers 34, 33 and which are parallel to the steering axes Y2, Y1 and the rear imaginary lines J which pass the rear ends 34B, 33B of the one shock absorbers 34, 33 and which are parallel to the steering axes Y2, Y1 in the perpendicular or substantially perpendicular direction M to the wheel axes Z2, Z1 and the steering axes Y2, Y1, (b) the areas which are located inwards of the external shapes K of the wheels 32b, 31b of the one front wheels 31, 32, and (c) the areas which are located outside the areas L defined between the front telescopic elements 342, 332 and the rear telescopic elements 341, 331 of the one shock absorbers 33, 34.

When the one front wheels 32, 31 are referred to individually herein, the front wheel 31 means the left front wheel 33 in relation to the left detecting portion 812 of the left front wheel rotation speed detector 81 detecting the rotation speed of the left front wheel 31, and the front wheel 32 means the right front wheel 34 in relation to the right detecting portion 822 of the right front wheel rotation speed detector 82 detecting the rotation speed of the right front wheel 32.

Additionally, when the one shock absorbers 34, 33 are referred to individually herein, the shock absorber 33 means the left shock absorber 33 in relation to the left detecting portion 812 of the left front wheel rotation speed detector 81 detecting the rotation speed of the left front wheel 31, and the shock absorber 34 means the right shock absorber 34 in relation to the right detecting portion 822 of the right front wheel rotation speed detector 82 detecting the rotation speed of the right front wheel 32.

Namely, at least a portion of the left detecting portion 812 is supported on the left front telescopic element 332 or the left rear telescopic element 331 of the left shock absorber 33 and is positioned in, as viewed in the direction of the left wheel axis Z1, (a) the area which is defined by the front imaginary line I which passes the front end 33A of the left shock absorber 33 and which is parallel to the left steering axis Y1 and the rear imaginary line J which passes the rear end 33B of the left shock absorber 33 and which is parallel to the left steering axis Y1 in the perpendicular or substantially perpendicular direction M to the left wheel axis Z1 and the left steering axis Y1, (b) the area which is located inwards of the external shape K of the left wheel 31b, and (c) the area which is located outside the area L defined between the left front telescopic element 332 and the left rear telescopic element 331 of the left shock absorber 33.

Additionally, at least a portion of the right detecting portion 822 is supported on the right front telescopic element 342 or the right rear telescopic element 341 of the right shock absorber 34 and is positioned in, as viewed in the direction of the right wheel axis Z2, (a) the area which is defined by the front imaginary line I which passes the front end 34A of the right shock absorber 34 and which is parallel to the right steering axis Y2 and the rear imaginary line J which passes the rear end 34B of the right shock absorber 34 and which is parallel to the right steering axis Y2 in the perpendicular or substantially perpendicular direction M to the right wheel axis Z2 and the right steering axis Y2, (b) the area which is located inwards of the external shape K of the right wheel 32b, and (c) the area which is located outside the area L defined between the right front telescopic element 342 and the right rear telescopic element 341 of the right shock absorber 34.

According to the vehicle 1 of the present preferred embodiment, (c) at least portions of the detecting portions 822, 812 of the front wheel rotation speed detectors 82, 81 are provided, respectively, in the areas which are located outside the areas L between the front telescopic elements 342, 332 and the rear telescopic elements 341, 331 of the one shock absorbers 34, 33.

Since the front telescopic elements 342, 332 and the rear telescopic elements 341, 331 are disposed with narrow intervals, as viewed in the direction of the steering axes Y2, Y1, the moving spaces of the front telescopic elements 342, 332 and the rear telescopic elements 341, 331 which result when the shock absorbers 34, 33 turn about the steering axes Y2, Y1, respectively are prevented from being enlarged.

Additionally, (a) at least portions of the detecting portions 822, 812 of the front wheel rotation speed detectors 82, 81 are provided in the areas which are defined by the front imaginary lines I which pass the front ends 34A, 33A of the one shock absorbers 34, 33 and which are parallel to the steering axes Y2, Y1 and the rear imaginary lines J which pass the rear ends 34B, 33B of the one shock absorbers 34, 33 and which are parallel to the steering axes Y2, Y1 in the perpendicular or substantially perpendicular direction M to the wheel axes Z2, Z1 and the steering axes Y2, Y1, as viewed from the direction of the wheel axes Z2, Z1.

According to this configuration, as viewed from the direction of the steering axes Y2, Y1, at least portions of the detecting portions 822, 812 of the front wheel rotation speed detectors 82, 81 are provided in the positions which overlap the corresponding moving spaces of the front telescopic elements 342, 332 and the rear telescopic elements 341, 331 of the one shock absorbers 33, 34. Namely, as viewed from the direction of the steering axes Y2, Y1, when the shock absorbers 34, 33 which include the detecting portions 822, 812 and the front telescopic elements 342, 332 and the rear telescopic elements 341, 331 turn about the steering axes Y2, Y1, respectively, at least portions of the moving spaces of the detecting portions 822, 812 overlap the moving spaces of the front telescopic elements 342, 332 and the rear telescopic elements 341, 331. Because of this, although the detecting portions 822, 812 are mounted on the vehicle 1, the moving spaces of the front wheel rotation speed detectors 82, 81 and the front telescopic elements 342, 332 and the rear telescopic elements 341, 331 are prevented from being enlarged as viewed in the direction of the steering axes Y2, Y1.

Further, in the areas, (b) at least portions of the detecting portions 822, 812 of the front wheel rotation speed detectors 82, 81 are provided in the areas which are located inwards of the external shapes K of the wheels 32b, 31b of the one front wheels 31, 32 as viewed in the direction of the wheel axis Z2, Z1.

Namely, the detecting portions 822, 812 of the front wheel rotation speed detectors 82, 81 are positioned, as viewed in the direction of the wheel axes Z2, Z1, within the specific areas of which the upper limits and the lower limits are determined in the direction of the steering axes Y2, Y1. Because of this, when the volume of the three-dimensional moving space is considered, the moving spaces of the detecting portions 822, 812 and the front telescopic elements 342, 332 and the rear telescopic elements 341, 331 are prevented from being enlarged.

For these reasons, although the front wheel rotation speed detectors 82, 81 are mounted, the moving spaces of the shock absorbers 34, 33 which include the front telescopic elements 342, 332 and the rear telescopic elements 341, 331 are prevented from being enlarged, which prevents an enlargement in the size of the vehicle 1 including the body frame 21 that leans and the two front wheels 31, 32 which are aligned in a left-and-right direction.

Figure 8:
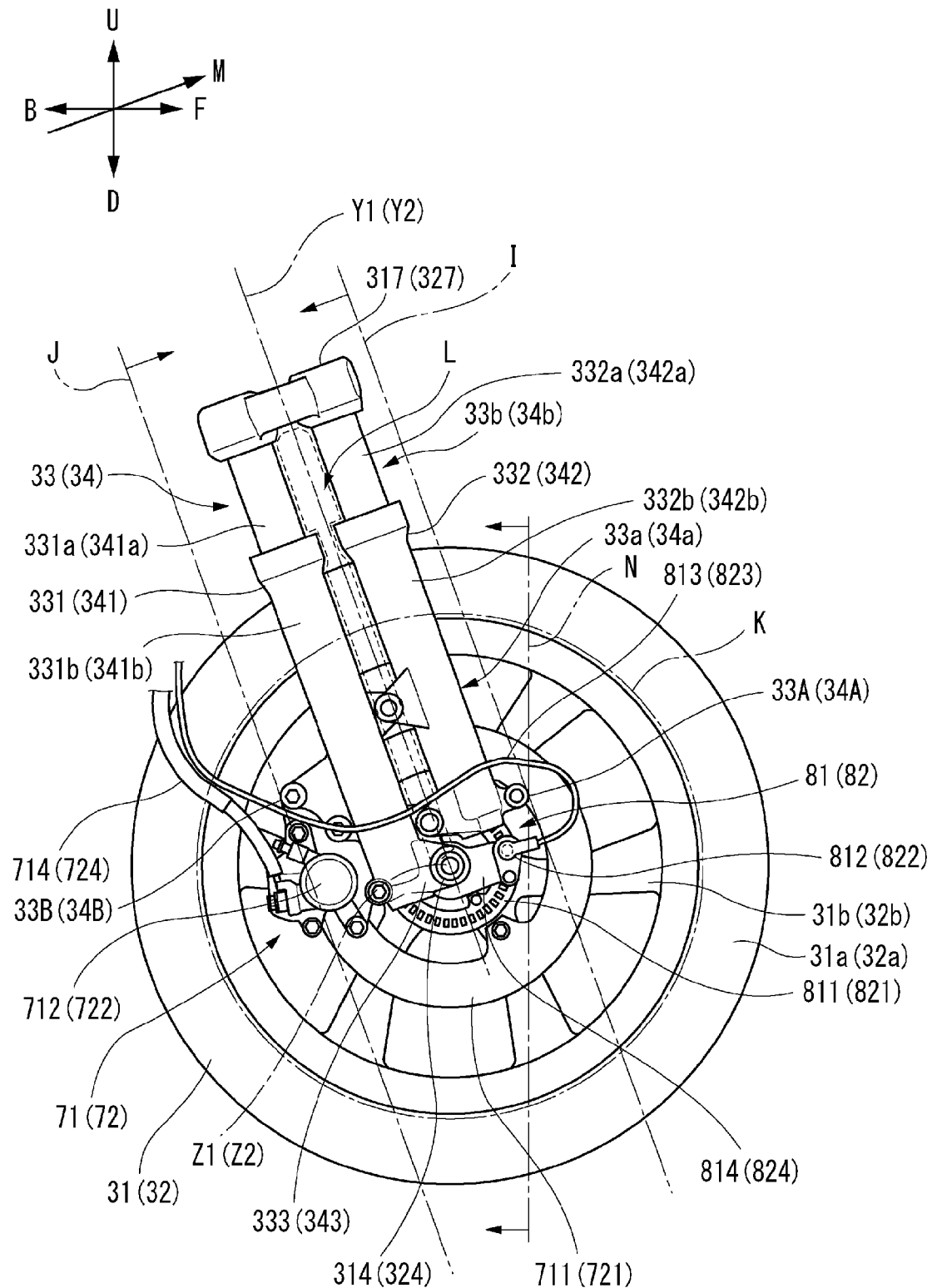
FIG. 8 is a side view of the left front wheel as viewed from the right front wheel.

FIG. 8 is a view showing a state in which an auxiliary line N is added to FIG. 7. The auxiliary line N is a vertical straight line which passes the front ends 34A, 33A of the shock absorbers 34, 33.

In the present preferred embodiment, as shown in FIG. 8, the steering axes Y2, Y1 are configured so that the upper portions thereof are positioned farther rearwards than the lower portions thereof in the front-and-rear direction of the body frame 21 when the vehicle 1 is in the upright state, and at least the portions of the detecting portions 822, 812 of the front wheel rotation speed detectors 82, 81 are provided in the areas which are located behind the front ends 34A, 33A of the one shock absorbers 34, 33 (behind the auxiliary lines N) and the areas which are located outside of the areas L defined between the front telescopic elements 342, 332 and the rear telescopic elements 341, 331 when the vehicle 1 is in the upright state.

In the case of the steering axes Y2, Y1 being inclined so that the upper portions of the steering axes Y2, Y1 are positioned farther rearwards than the lower portions thereof, the moving spaces of the front telescopic elements 342, 332 and the rear telescopic elements 341, 331 which result when the shock absorbers 34, 33 turn about the steering axes Y2, Y1 tend to be shaped so that the front ends of the lower portions project forward of the upper portions.

According to the vehicle 1 of the present preferred embodiment, at least the portions of the detecting portions 822, 812 are provided in the areas which are located behind the front ends 34A, 33A of the one shock absorbers 34, 33 (behind the auxiliary lines N) and the areas which are located outside the areas L between the front telescopic elements 342, 332 and the rear telescopic elements 341, 331 of the one shock absorbers 34, 33. Namely, since at least the portions of the detecting portions 822, 812 are disposed in the areas located behind the front ends 34A, 33A of the shock absorbers 34, 33 (behind the auxiliary lines N) as viewed in the direction of the wheel axes Z2, Z1, it is unlikely that the front portions of the lower portions of the moving spaces of the detecting portions 822, 812 and the front telescopic elements 342, 332 and the rear telescopic elements 341, 331 are enlarged. This prevents the moving spaces of the shock absorbing devices including the front telescopic elements 342, 332 and the rear telescopic elements 341, 331 from being enlarged although the front wheel rotation speed detectors 82, 81 are mounted thereon.

Further, since at least the portions of the detecting portions 822, 812 are positioned behind the front ends 34A, 33A of the shock absorbers 34, 33, the detecting portions 822, 812 are protected against objects (for example, a curb) which approach the detecting portions 822, 812 from the front thereof by the shock absorbers 34, 33.

Figure 9:
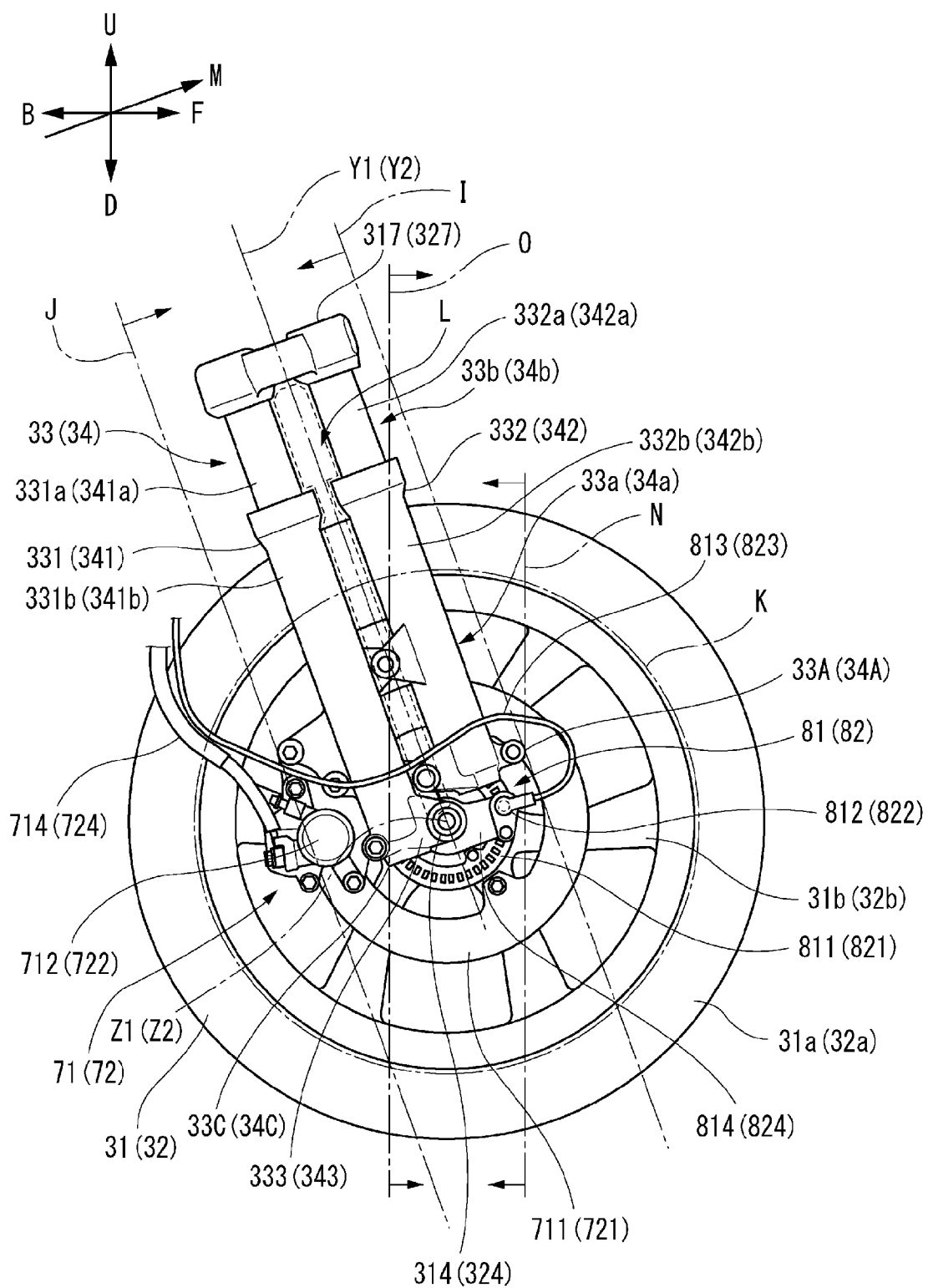
FIG. 9 is a side view of the left front wheel as viewed from the right front wheel.

FIG. 9 is a view showing a state in which auxiliary lines N, O are added to FIG. 7. The auxiliary line O is a vertical straight line which passes lower ends 34C, 33C of the shock absorbers 34, 33. In the present preferred embodiment, as shown in FIG. 9, the steering axes Y2, Y1 are configured so that the upper portions thereof are positioned farther rearwards than the lower portions thereof in the front-and-rear direction of the body frame 21 when the vehicle 1 is in the upright state, and at least the portions of the detecting portions 822, 812 of the front wheel rotation speed detectors 82, 81 are provided in the areas which are located behind the front ends 34A, 33A of the one shock absorbers 34, 33 (behind the auxiliary lines N), areas which are located ahead of the lower ends 34C, 33C (ahead of the auxiliary lines O), and the areas which are located outside of the areas L defined between the front telescopic elements 342, 332 and the rear telescopic elements 341, 331 of the one shock absorbers 34, 33 when the vehicle 1 is in the upright state.

In the case of the steering axes Y2, Y1 being inclined so that the upper portions of the steering axes Y2, Y1 are positioned farther rearwards than the lower portions thereof, the moving spaces of the front telescopic elements 342, 332 and the rear telescopic elements 341, 331 which result when the shock absorbers 34, 33 turn about the steering axes Y2, Y1 tend to be shaped so that the rear ends of the upper portions project forward of the lower portions.

According to the vehicle 1 of the present preferred embodiment, at least the portions of the detecting portions 822, 812 are provided in the areas which are located behind the front ends 34A, 33A of the one shock absorbers 34, 33 (behind the auxiliary lines N), the areas which are located ahead of the lower ends 34C, 33C of the one shock absorbers 34, 33 (ahead of the auxiliary lines O), and the areas which are located outside the areas L defined between the front telescopic elements 342, 322 and the rear telescopic elements 341, 331 of the one shock absorbers 34, 33 when the vehicle 1 is in the upright state.

Namely, since at least the portions of the detecting portions 822, 812 are disposed in the areas located behind the front ends 34A, 33A of the one shock absorbers 34, 33 as viewed in the direction of the wheel axes Z2, Z1, it is unlikely that the front portions of the lower portions of the moving spaces of the detecting portions 822, 812 and the front telescopic elements 342, 332 and the rear telescopic elements 341, 331 are enlarged.

Further, since at least the portions of the detecting portions 822, 812 are disposed in the areas located ahead of the lower ends 34C, 33C of the one shock absorbers 34, 33 (ahead of the auxiliary lines O) as viewed in the direction of the wheel axes Z2, Z1, it is unlikely that the front portions of the lower portions of the moving spaces of the detecting portions 822, 812 and the front telescopic elements 342, 332 and the rear telescopic elements 341, 331 are enlarged.

This prevents the moving spaces of the shock absorbers 34, 33 including the front telescopic elements 342, 332 and the rear telescopic elements 341, 331 from being enlarged although the front wheel rotation speed detectors 82, 81 are mounted thereon.

Further, since at least the portions of the detecting portions 822, 812 are positioned behind the front ends 33A, 33A of the one shock absorber 34, 33, the detecting portions 822, 812 are protected against objects which approach the detecting portions 822, 812 from the front thereof by the shock absorbers 34, 33. Additionally, since at least the portions of the detecting portions 822, 812 are positioned forward of the lower ends 34C, 33C of the one shock absorber 34, 33, the detecting portions 822, 812 are protected against objects which approach the detecting portions 822, 812 from the rear thereof by the shock absorbers 34, 33.

Figure 10:
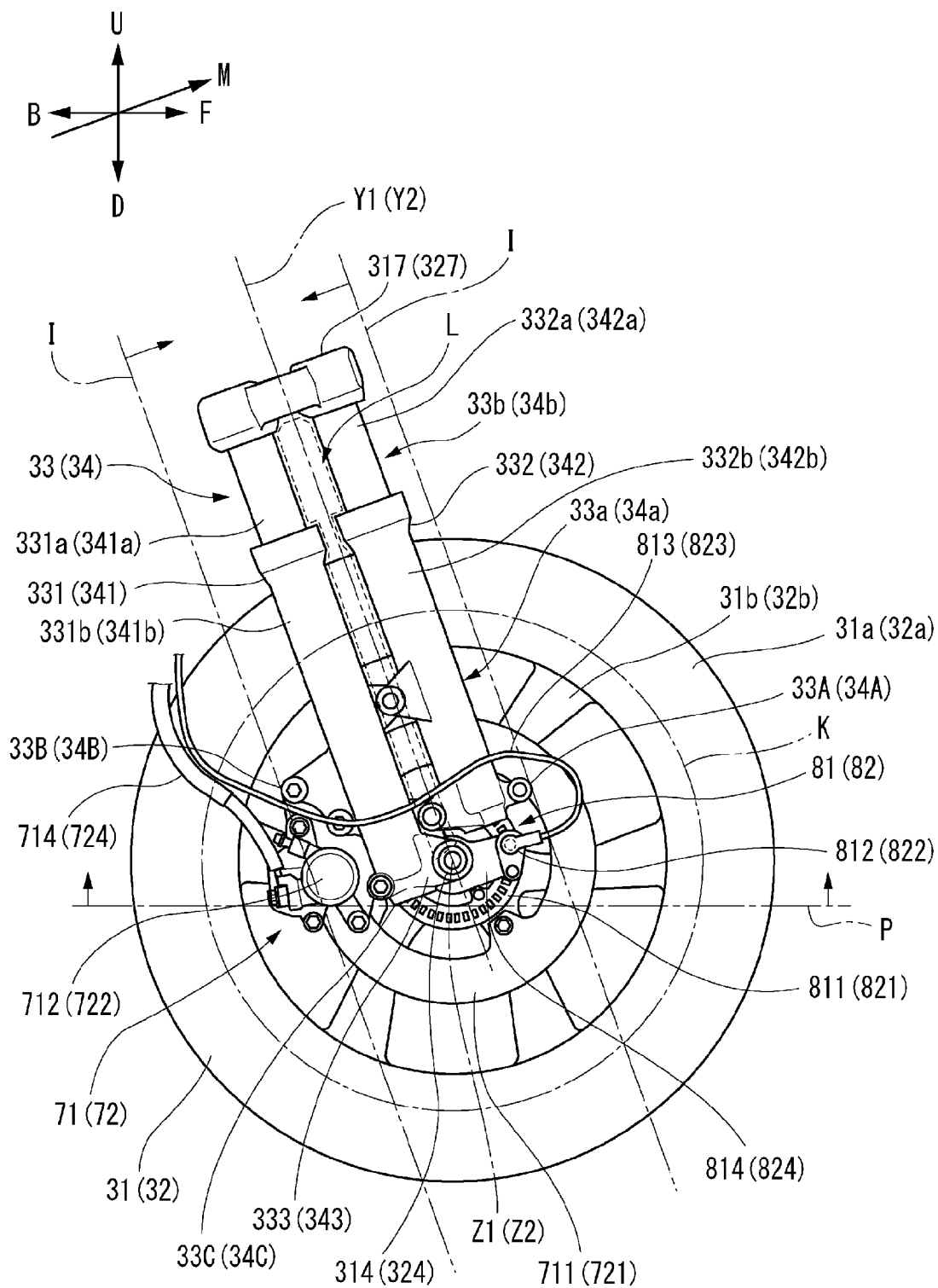
FIG. 10 is a side view of the left front wheel as viewed from the right front wheel.

FIG. 10 is a view showing a state in which an auxiliary line P is added to FIG. 7. The auxiliary line P is a horizontal straight line which passes lower ends 34C, 33C of the shock absorbers 34, 33.

In the present preferred embodiment, as shown in FIG. 10, the steering axes Y2, Y1 are configured so that the upper portions thereof are positioned farther rearwards than the lower portions thereof in the front-and-rear direction of the body frame 21 when the vehicle 1 is in the upright state, and at least the portions of the detecting portions 822, 812 of the front wheel rotation speed detectors 82, 81 are provided in areas which are located above the lower ends 34C, 33C of the one shock absorbers 34, 33 (above the auxiliary lines P) in relation to the up-and-down direction of the body frame 21 and the areas which are located outside of the areas L defined between the front telescopic elements 342, 332 and the rear telescopic elements 341, 331 of the one shock absorbers 34, 33 when the vehicle 1 is in the upright state.

In the case of the steering axes Y2, Y1 being inclined so that the upper portions of the steering axes Y2, Y1 are positioned farther rearwards than the lower portions thereof, the moving spaces of the front telescopic elements 342, 332 and the rear telescopic elements 341, 331 which result when the shock absorbers 34, 33 turn about the steering axes Y2, Y1 tend to be shaped so that the front ends of the lower portions project ahead of the upper portions.

According to the vehicle 1 of the present preferred embodiment, at least the portions of the detecting portions 822, 812 are provided in the areas which are located above the lower ends 34C, 33C of the one shock absorbers 34, 33 in relation to the up-and-down direction of the body frame 21, and the areas which are located outside the areas L defined between the front telescopic elements 342, 332 and the rear telescopic elements 341, 331 of the one shock absorbers 34, 33 when the vehicle 1 is in the upright state.

Namely, since at least the portions of the detecting portions 822, 812 are disposed in the areas which are located above the lower ends 34C, 33C of the one shock absorbers 34, 33 (above the auxiliary lines P) in relation to the up-and-down direction of the body frame 21 as viewed in the direction of the wheel axes Z2, Z1, it is unlikely that the moving spaces of the detecting portions 822, 812 and the front telescopic elements 342, 332 and the rear telescopic elements 341, 331 are enlarged in relation to the direction of the steering axes Y2, Y1.

Further, since at least the portions of the detecting portions 822, 812 are positioned above the lower ends 34C, 33C of the one shock absorbers 34, 33 (above the auxiliary lines P) in relation to the up-and-down direction of the body frame 21, the detecting portions 822, 812 are protected against objects which approach the detecting portions 822, 812 from therebelow by the shock absorbers 34, 33.

Figure 11:
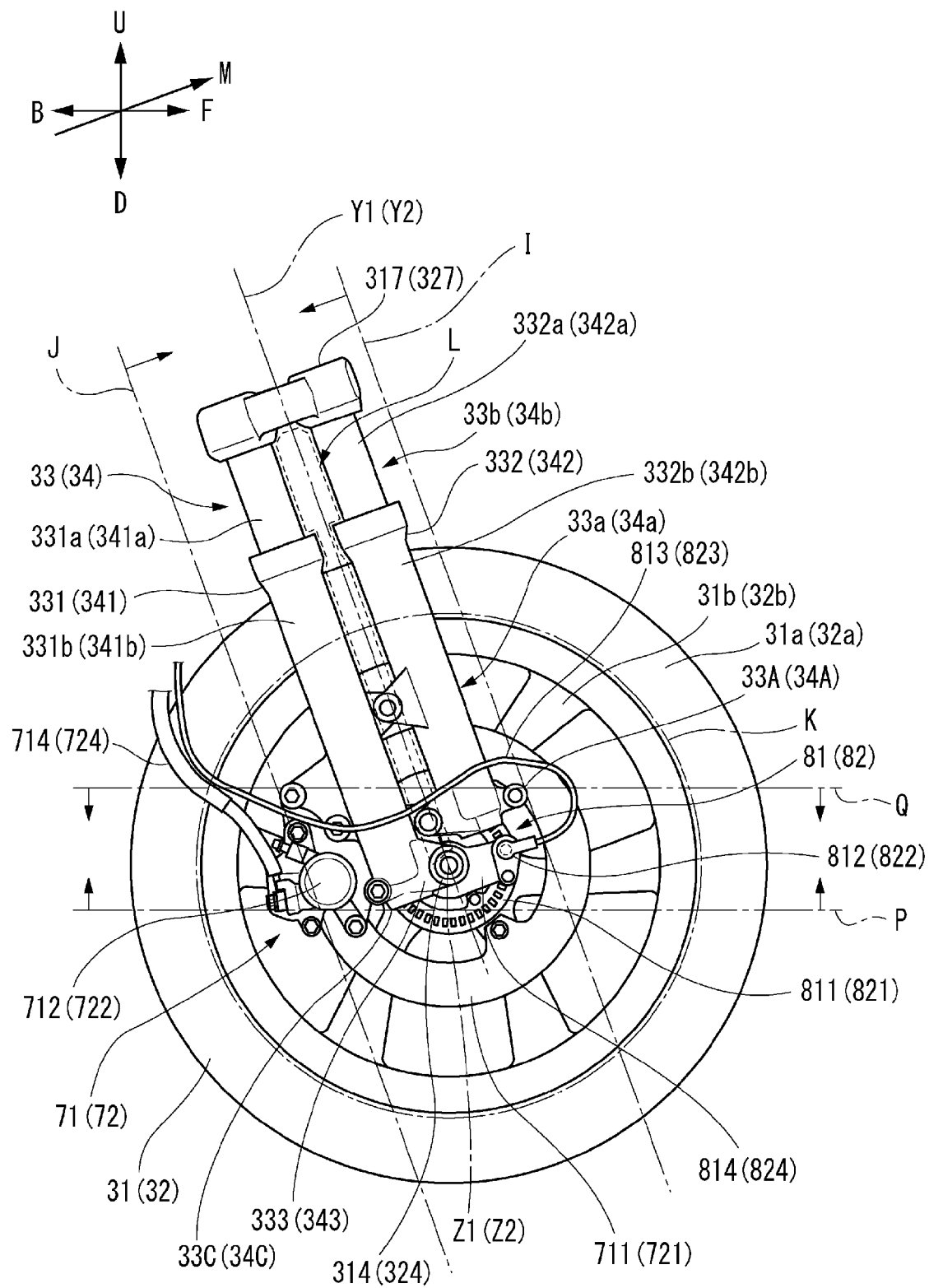
FIG. 11 is a side view of the left front wheel as viewed from the right front wheel.

FIG. 11 is a view showing a state in which auxiliary lines P, Q are added to FIG. 7. The auxiliary line Q is a horizontal line which passes the front ends 34A, 33A of the front telescopic elements 342, 332.

In the present preferred embodiment, as shown in FIG. 11, the steering axes Y2, Y1 are configured so that the upper portions thereof are positioned farther rearwards than the lower portions thereof in the front-and-rear direction of the body frame 21 when the vehicle 1 is in the upright state, and at least the portions of the detecting portions 822, 812 of the front wheel rotation speed detectors 82, 81 are provided in the areas which are located above the lower ends 34C, 33C of the rear telescopic elements 341, 331 of the one shock absorbers 34, 33 (above the auxiliary lines P) in relation to the up-and-down direction of the body frame 21, areas which are located below the front ends 34A, 33A of the front telescopic elements 342, 332 of the one shock absorbers 34, 33 (below the auxiliary lines Q) in relation to the up-and-down direction of the body frame 21, and the areas which are located outside of the areas L defined between the front telescopic elements 342, 332 and the rear telescopic elements 341, 331 of the one shock absorbers 34, 33 when the vehicle 1 is in the upright state.

In the present preferred embodiment, the lower ends 34C, 33C of the shock absorbers 34, 33 coincide with the lower ends 34C, 33C of the rear telescopic elements 341, 331. In addition, the front ends 34A, 33A of the shock absorbers 34, 33 coincide with the front ends 34A, 33A of the front telescopic elements 342, 332.

In the case of the steering axes Y2, Y1 being inclined so that the upper portions of the steering axes Y2, Y1 are positioned farther rearwards than the lower portions thereof, the moving spaces of the front telescopic elements 342, 332 and the rear telescopic elements 341, 331 which result when the shock absorbers 34, 33 turn about the steering axes Y2, Y1 tend to be shaped so that the front ends of the lower portions thereof project forward of the upper portions and the rear ends of the upper portions thereof project behind the lower portions.

According to the vehicle 1 of the present preferred embodiment, at least the portions of the detecting portions 822, 812 are provided in the areas which are located above the lower ends 34C, 33C of the rear telescopic elements 341, 331 of the one shock absorbers 34, 33 (above the auxiliary lines P) in relation to the up-and-down direction of the body frame 21, the areas which are located below the front ends 34A, 33A of the front telescopic elements 342, 332 of the one shock absorbers 34, 33 (below the auxiliary lines Q) in relation to the up-and-down direction of the body frame 21, and the areas which are located outside the areas L defined between the front telescopic elements 342, 332 and the rear telescopic elements 341, 331 of the one shock absorbers 34, 33 when the vehicle 1 is in the upright state.

Namely, since at least the portions of the detecting portions 822, 812 are disposed in the areas which are located above the lower ends 34C, 33C of the one shock absorbers 34, 33 (above the auxiliary lines P) in relation to the up-and-down direction of the body frame 21 as viewed in the direction of the wheel axes Z2, Z1, it is unlikely that the moving spaces of the detecting portions 822, 812 and the front telescopic elements 342, 332 and the rear telescopic elements 341, 331 are enlarged in relation to the direction of the steering axes Y2, Y1.

In addition, since at least the portions of the detecting portions 822, 812 are disposed in the areas which are located above the lower ends 34C, 33C of the one shock absorbers 34, 33 (above the auxiliary lines P) in relation to the up-and-down direction of the body frame 21 and the areas which are located below the front ends 34A, 33A of the one shock absorbers 34, 33 (below the auxiliary lines Q) as viewed in the direction of the wheel axes Z2, Z1, it is unlikely that the moving spaces of the detecting portions 822, 812 and the front telescopic elements 342, 332 and the rear telescopic elements 341, 331 are enlarged in relation to the direction of the steering axes Y2, Y1.

The preferred embodiments that have been described heretofore are intended to facilitate the understanding of the present invention and is not intended to limit the present invention. The preferred embodiments of the present invention can be modified or improved without departing from the spirit and scope thereof and that their equivalents can also be included in the present invention.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

For example, in a preferred embodiment of the present invention, while the suspension device preferably includes the parallelogram link mechanism 5, the present invention is not limited thereto. The suspension device may have a double-wishbone link mechanism.

In a preferred embodiment, while the left shock absorber 33 is preferably positioned on the right side of the left front wheel 31, and the right shock absorber 34 is described as being positioned on the left side of the right front wheel, the present invention is not limited thereto. The left shock absorber 33 may be positioned on the left side of the left front wheel 31, and the right shock absorber 34 may be positioned on the right side of the right front wheel.

In addition, in a preferred embodiment, the lower end of the left front telescopic element 332 is preferably positioned above the lower end of the left rear telescopic element 331 and the lower end of the right front telescopic element 342 is preferably positioned above the lower end of the right rear telescopic element 341, the present invention is not limited thereto.

The lower end of the left front telescopic element 332 may be positioned below the lower end of the left rear telescopic element 331 and the lower end of the right front telescopic element 342 may be positioned below the lower end of the right rear telescopic element 341.

In a preferred embodiment of the present invention, while the vehicle 1 preferably includes both the left front wheel rotation speed detector 81 and the right front wheel rotation speed detector 82, the vehicle 1 may include only one of the left front wheel rotation speed detector 81 and the right front wheel rotation speed detector 82.

In addition, in a preferred embodiment of the present invention, the front wheel rotating speed detector preferably includes the detecting portion, the detected portion, the sensor cord, and the sensor stay, the present invention is not limited thereto. In addition to those elements, the front wheel rotation speed detector may include one or more brackets with which the detecting portion is fixed to the telescopic elements or the like.

The positions of the detecting portions 822, 812 of the front wheel rotation speed detectors 82, 81 are not limited to those described in the preferred embodiments described above.

In a preferred embodiment of the present invention, at least the portions of the detecting portions 822, 812 of the front wheel rotation speed detectors 82, 81 are preferably positioned in, as viewed in the direction of the wheel axes Z2, Z1, (a) the areas which are defined by the front imaginary lines which pass the front ends of the one shock absorbers 34, 33 and which are parallel to the steering axes Y2, Y1 and the rear imaginary lines which pass the rear ends of the one shock absorbers 34, 33 and which are parallel to the steering axes Y2, Y1 in the perpendicular or substantially perpendicular direction to the wheel axes Z2, Z1 and the steering axes Y2, Y1, (b) the areas which are located inwards of the external shapes of the wheels 32b, 31b and (c) the areas which are located outside the areas L defined between the front telescopic elements 342, 322 of the one shock absorbers 34, 33 and the rear telescopic elements 341, 331.

The detecting portions 822, 812 of the front wheel rotation speed detectors 82, 81 may entirely be positioned in the areas which are defined as the areas (a), (b), and (c). Alternatively, the front wheel rotation speed detectors 82, 81 may entirely be positioned in the areas which are defined as (a), (b), and (c).

At least the portions of the detecting portions 822, 812 of the front wheel speed detectors 82, 81 may be provided in the areas which are defined as the areas (a), (b) and (c), and (d) the areas located behind the front ends of the one shock absorbers 34, 33 and the areas which are located outside the areas L defined between the front telescopic elements 342, 332 and the rear telescopic elements 341, 331 of the one shock absorbers 34, 33 when the vehicle 1, 1A is in the upright state.

Alternatively, at least the portions of the detecting portions 822, 812 of the front wheel rotation speed detectors 82, 81 may be positioned in the areas which are defined as (a), (b) and (c) and areas located outside the areas which are defined as the areas (d).

At least the portions of the detecting portions 822, 812 of the front wheel rotation speed detectors 82, 81 may be provided in the areas which are defined as the areas (a), (b) and (c), and (e) the areas located behind the front ends of the one shock absorbers 34, 33 and the areas which are located forward of the lower ends of the one shock absorbers 34, 33 and the areas which are located outside the areas L defined between the front telescopic elements 342, 332 and the rear telescopic elements 341, 331 of the one shock absorbers 34, 33 when the vehicle 1, 1A is in the upright state.

Alternatively, at least the portions of the detecting portions 822, 812 of the front wheel rotation speed detectors 82, 81 may be positioned in the areas which are defined as the areas (a), (b) and (c) and areas located outside the areas which are defined as the areas (e).

At least the portions of the detecting portions 822, 812 of the front wheel rotation speed detectors 82, 81 may be provided in the areas which are defined as the areas (a), (b) and (c), and (f) the areas located above the lower ends of the one shock absorbers 34, 33 in relation to the up-and-down direction of the body frame 21 and the areas which are located outside the areas L defined between the front telescopic elements 342, 332 and the rear telescopic elements 341, 331 of the one shock absorbers 34, 33 when the vehicle 1, 1A is in the upright state.

Alternatively, at least the portions of the detecting portions 822, 812 of the front wheel rotation speed detectors 82, 81 may be positioned in the areas which are defined as the areas (a), (b) and (c) and areas located outside the areas which are defined as the areas (f).

At least the portions of the detecting portions 822, 812 of the front wheel rotation speed detectors 82, 81 may be provided in the areas which are defined as the areas (a), (b) and (c), and (g) the areas located above the lower ends of the rear telescopic elements 341, 331 of the one shock absorbers 34, 33 in relation to the up-and-down direction of the body frame 21, the areas located below the front ends of the front telescopic elements 342, 332 of the one shock absorbers 34, 33 in relation to the up-and-down direction of the body frame 21 and the areas which are located outside the areas L defined between the front telescopic elements 342, 332 and the rear telescopic elements 341, 331 of the one shock absorbers 34, 33 when the vehicle 1, 1A is in the upright state.

Alternatively, at least the portions of the detecting portions 822, 812 of the front wheel rotation speed detectors 82, 81 may be positioned in the areas which are defined as the areas (a), (b) and (c) and areas located outside the areas which are defined as the areas (g).

In addition, in a preferred embodiment of the present invention, while the left detecting portion 812 is preferably fixed to the right surface of the left axle support portion 333 and the right detecting portion 822 is preferably fixed to the left surface of the right axle support portion 343, the present invention is not limited thereto. For example, the left detecting portion 812 may be fixed to anyone of the left surface, the right surface, the front surface, and the rear surface of the left front inner element 332a, the left front outer element 332b, the left rear inner element 331a, and the left rear outer element 331b, respectively. The right detecting portion 822 may be fixed to anyone of the left surface, the right surface, the front surface, and the rear surface of the right front inner element 342a, the right front outer element 342b, the right rear inner element 341a, and the right rear outer element 341b, respectively.

In the preferred embodiments of the present invention, the acute angles are angles that include 0° and that are smaller than 90°. Originally, the acute angles do not include 0°, but in the preferred embodiments, it is understood that the acute angles include 0°. In the preferred embodiments, the imaginary plane that intersects perpendicular or substantially perpendicularly the upper axes and the lower axes of the cross members is a plane that extends rearwards and upwards. However, the present invention is not limited thereto, and hence, the imaginary plane that intersects perpendicular or substantially perpendicularly the upper axes and the lower axes of the cross members may be a plane that extends forwards and upwards.

When referred to in this description, "parallel" also includes two straight lines that do not intersect each other as members while they are inclined within the range of ±40°. When used together with a "direction" and a "member" in the present invention, "along" also includes a case where what follows the direction and the member is inclined relative thereto within the range of ±40°. When used together with a "direction" in the present invention, "extend" also includes a case where what extends is inclined relative to the direction within the range of ±40°.

The vehicle 1 according to the preferred embodiments described above is preferably a vehicle 1 including a body frame that leans and two wheels that are aligned in a left-and-right direction. The vehicle 1 may be a vehicle that includes two front wheels and one or more rear wheels or a vehicle that includes two rear wheels and one or more front wheels. The vehicle may include a body cover that covers the body frame. The vehicle may not include the body cover which covers the body frame. The power unit includes the power source. The power source is not limited to the engine and hence may be an electric motor.

In the preferred embodiments described above, the center in the left-and-right direction of the body frame 21 of the rear wheel 4 preferably coincides with the center in the left-and-right direction of the body frame 21 of the distance defined between the left front wheel 31 and the right front wheel 32. Although the configuration described above is preferable, the center in the left-and-right direction of the body frame 21 of the rear wheel 4 does not have to coincide with the center in the left-and-right direction of the body frame 21 of the distance defined between the left front wheel 31 and the right front wheel 32.

In the preferred embodiments described above, the right side portion 54, the left side portion 53, and the headstock 211 are preferably provided in positions that are superposed one on another when the body frame 21 is viewed from the sides thereof. However, when the body frame 21 is viewed from the side thereof, the headstock 211 may be provided in a different position from the positions where the right side portion 53 and the left side portion 54 are provided in relation to the front-and-rear direction. Additionally, angles at which the right side portion 54 and the left side portion 53 lean from the up-and-down direction of the body frame 21 may differ from an angle at which the headstock 211 leans.

The headstock that supports the link mechanism may be made of a single structural element or a plurality of structural elements. In the case of the headstock being made of a plurality of structural elements, the structural elements may be joined together through welding, bonding or the like. Alternatively, the structural elements may be joined together with fastening members such as bolts, rivets or the like.

In the preferred embodiments described above, while the headstock 211 is preferably a portion of the body frame 21 that supports the steering shaft 60 so as to turn, the present invention is not limited thereto. A member can be used which supports the steering shaft 60 so as to turn about a middle steering axis Y3 in place of the headstock. For example, a member can be used which includes a bearing which supports the steering shaft 60 so as to turn about the middle steering axis Y3.

In the preferred embodiments described above, the body frame preferably includes the link support portion that supports the link such as the headstock, the connecting member (the upper front and rear frame portions), the down frame (the upper and lower frame portions), and the under frame (the lower front and rear frame portions), and these constituent structural elements are connected together through welding, for example. However, the body frame of the present invention is not limited to the preferred embodiments described above. The body frame should have the link support portion, the upper front and rear frame portions, the upper and lower frame portions, the lower front and rear frame portions. For example, the body frame may be entirely integral or partially integral through casting. Additionally, in the body frame, the upper front and rear frame portions and the upper and lower frame portions may include a single member or may include separate members.

In the preferred embodiments described above, the left shock absorber 33 and the right shock absorber 34 each preferably include the pair of telescopic mechanisms. However, depending upon the specification of the vehicle 1, the number of telescopic mechanisms that the left shock absorber 33 and the right shock absorber 34 include individually may be one.

In the preferred embodiments described above, an acute angle defined by the turning axis of the steering shaft and the up-and-down direction of the body frame coincides with an acute angle defined by the direction in which the right shock absorber and the left shock absorber extend or contract and the up-and-down direction of the body frame. However, the present invention is not limited to the preferred embodiments described above. For example, the acute angle defined by the middle steering axis Y3 of the steering shaft and the up-and-down direction of the body frame may be smaller or larger than the acute angle defined by the direction in which the right shock absorber and the left shock absorber extend or contract and the up-and-down direction of the body frame.

In addition, in the preferred embodiments described above, the middle steering axis Y3 of the steering shaft and the direction in which the right shock absorber and the left shock absorber extend or contact preferably coincide with each other. However, the present invention is not limited to the preferred embodiments described above. In a side view of the vehicle being in the upright state, the turning axis of the steering shaft and the direction in which the right shock absorber and the left shock absorber extend or contact may be spaced away from each other in the front-and-rear direction. Additionally, for example, the turning axis of the steering shaft and the direction in which the right shock absorber and the left shock absorber extend or contact may intersect each other.

Further, in the preferred embodiments described above, the direction in which the right shock absorber extends and contracts preferably coincides with right steering axis Y2 of the right shock absorber, and the direction in which the right shock absorber extends and contracts preferably coincides with the left steering axis Y1 of the left shock absorber. However, the present invention is not limited to the preferred embodiments described above. The direction in which the right shock absorber extends and contracts may not coincide with the right steering axis Y2 of the right shock absorber, and the direction in which the right shock absorber extends and contracts may not coincide with the left steering axis Y1 of the left shock absorber.

In the preferred embodiments described above, the right front wheel and the left front wheel are supported so that their upper ends preferably move farther upwards in the up-and-down direction of the body frame than an upper end of the down frame of the body frame. However, the present invention is not limited to the preferred embodiments described above. In the preferred embodiments described above, the right front wheel and the left front wheel may be able to move upwards as high as or to a height that is lower than the upper end of the down frame of the body frame in the up-and-down direction of the body frame.

The upper cross portion may include an upper front cross portion that is made up of a single structural element, an upper rear cross portion that is made up of a single structural element, and a connecting member that is provided between the upper and lower cross portions and that is made of a plurality of structural elements. In the case of the headstock being made of a plurality of structural elements, the structural elements may be joined together through welding, bonding or the like. Alternatively, the structural elements may be joined together with fastening members such as bolts, rivets or the like.

The lower cross portion may include a lower front cross portion that is made up a single structural element, a lower rear cross portion that is made of a single structural element and a connecting member that is provided between the lower front and rear cross portions and that is made of a plurality of structural elements. In the case of the headstock being made of a plurality of structural elements, the structural elements may be joined together through welding, bonding or the like. Alternatively, the structural elements may be joined together with fastening members such as bolts, rivets or the like.

The right side portion and the left side portion may each be made of a single structural element or a plurality of structural elements. In the case of the headstock being made of a plurality of structural elements, the structural elements may be joined together through welding, bonding or the like. Alternatively, the structural elements may be joined together with fastening members such as bolts, rivets or the like. The right side portion and the left side portion may each include a portion that is disposed ahead of the upper cross portion or the lower cross portion in the front-and-rear direction of the body frame and a portion that is disposed behind the upper cross portion or the lower cross portion in the front-and-rear direction of the body frame. The upper cross portion or the lower cross portion may be disposed between the portions that are disposed ahead of the right side portion and the left side portion and the portions that are disposed behind the right side portion and the left side portion.

In the preferred embodiments described above, the link mechanism may include further a cross portion in addition to the upper cross portion and the lower cross portion. The upper cross portion and the lower cross portion are so called only from their relative positional relationship in the up-and-down direction. The upper cross portion does not imply an uppermost cross portion in the link mechanism. The upper cross portion means a cross portion that is located above a cross portion that is located therebelow. The lower cross portion does not imply a lowermost cross portion in the link mechanism. The lower cross portion means a cross portion that is located below a cross portion that is located thereabove. Additionally, the cross portion may be made of two structural elements of a right cross portion and a left cross portion. In this way, the upper cross portion and the lower cross portion may each include a plurality of cross portions as long as they still exhibit the link function. Further, other cross portions may be provided between the upper cross portion and the lower cross portion. The link mechanism should include the upper cross portion and the lower cross portion.

The present invention can be embodied in many different forms. This disclosure should be understood to provide preferred embodiments of the present invention. Based on the understanding that the preferred embodiments that are described and/or illustrated herein are not intended to limit the present invention thereto, several preferred embodiments are described and illustrated herein.

Several illustrated embodiments of the present invention are described herein. The present invention is not limited to the various preferred embodiments described herein. The present invention also includes every preferred embodiment that includes equivalent elements, modifications, deletions, combinations (for example, a combination of characteristics of various embodiments), improvements and/or alternations that those skilled in the art to which the present invention pertains can recognize based on the disclosure herein. The limitative matters of claims should be construed broadly based on terms used in the claims and hence should not be limited by the preferred embodiments described in this description or the prosecution of this patent application. The preferred embodiments should be construed to be non-exclusive. For example, in this disclosure, such terms as "preferable" and "good" are non-exclusive terms and mean that "it is preferable but does not limit the present invention thereto" and "it is good but does not limit the present invention thereto," respectively.

The contents of the Japanese Patent Application No. 2013-138476 filed on Jul. 1, 2013 are incorporated by reference in their entirety and constitutes part of the description of this patent application. Namely, configurations which will be itemized below also constitute part of the description of this patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a body frame that leans to a right of the vehicle when the vehicle turns right and leans to a left of the vehicle when the vehicle turns left;
   a right front wheel and a left front wheel aligned in a left-and-right direction of the body frame and which each include a tire and a wheel that supports the tire;
   a suspension device including a right shock absorbing device and a left shock absorbing device that support the right front wheel and the left front wheel so as to rotate about wheel axes thereof, respectively, each of the right shock absorbing device and the left shock absorbing device including a front telescopic element and a rear telescopic element aligned in a front-and-rear direction of the body frame and a connecting portion that connects the front telescopic element and the rear telescopic element together and supports the right shock absorbing device and the left shock absorbing device on the body frame so that the right shock absorbing device and the left shock absorbing device turn individually about steering axes thereof which extend in a direction perpendicular or substantially perpendicular to the wheel axes and are able to be displaced in an up-and-down direction of the body frame; and
   a front wheel rotation speed detector which includes a detected portion which rotates together with one front wheel of the right front wheel and the left front wheel and a detecting portion which is provided on one shock absorbing device of the right shock absorbing device and the left shock absorbing device which supports the one front wheel to measure a rotation speed of at least the one front wheel; wherein
   at least a portion of the detecting portion of the front wheel rotation speed detector is supported on the front telescopic element or the rear telescopic element of the one shock absorbing device and is positioned, as viewed in a direction of the wheel axis, in an area which is defined by a front imaginary line which passes a front end of the one shock absorbing device and which is parallel or substantially parallel to the steering axis and a rear imaginary line which passes a rear end of the one shock absorbing device and which is parallel or substantially parallel to the steering axis, an area which is located inwards of an external shape of the one front wheel, and an area which is located outside an area defined between the front telescopic element and the rear telescopic element of the one shock absorbing device.

2. The vehicle according to claim 1, wherein
   an upper portion of the steering axis is positioned farther rearwards than a lower portion thereof in the front-and-rear direction of the body frame when the vehicle is in the upright state; and
   at least a portion of the detecting portion of the front wheel rotation speed detector is provided in an area which is located behind the front end of the one shock absorbing device and an area which is located outside of an area defined between the front telescopic element and the rear telescopic element of the one shock absorbing device when the vehicle is in the upright state.

3. The vehicle according to claim 1, wherein
   an upper portion of the steering axis is positioned farther rearwards than a lower portion thereof in the front-and-rear direction of the body frame when the vehicle is in the upright state; and
   at least a portion of the detecting portion of the front wheel rotation speed detector is provided in an area which is located behind a front end of the one shock absorbing device, an area which is located ahead of a lower end of the one shock absorbing device, and an area which is located outside an area defined between the front telescopic element and the rear telescopic element of the one shock absorbing device when the vehicle is in the upright state.

4. The vehicle according to claim 1, wherein
   an upper portion of the steering axis is positioned farther rearwards than a lower portion thereof in the front-and-rear direction of the body frame when the vehicle is in the upright state; and
   at least a portion of the detecting portion of the front wheel rotation speed detector is provided in an area which is located above a lower end of the one shock absorbing device in relation to an up-and-down direction of the body frame and an area which is located outside an area defined between the front telescopic element and the rear telescopic element of the one shock absorbing device when the vehicle is in the upright state.

5. The vehicle according to claim 1, wherein
   an upper portion of the steering axis is positioned farther rearwards than a lower portion thereof in the front-and-rear direction of the body frame when the vehicle is in the upright state; and
   at least a portion of the detecting portion of the front wheel rotation speed detector is provided in an area which is located above a lower end of the rear telescopic element of the one shock absorbing device in relation to an up-and-down direction of the body frame, an area which is located below a front end of the front telescopic element of the one shock absorbing device in relation to the up-and-down direction of the body frame, and an area which is located outside an area defined between the front telescopic element and the rear telescopic element of the one shock absorbing device when the vehicle is in the upright state.

* * * * *